(12) United States Patent
Li

(10) Patent No.: US 11,528,891 B2
(45) Date of Patent: Dec. 20, 2022

(54) METHODS AND SYSTEMS FOR CONTROLLING THE BARKING OF AN ANIMAL

(71) Applicant: SHENZHEN PATPET TECHNOLOGY CO., LTD., Shenzhen (CN)

(72) Inventor: Linxian Li, Beijing (CN)

(73) Assignee: SHENZHEN PATPET TECHNOLOGY CO., LTD., Shenzhen (CN)

( * ) Notice: Subject to any disclaimer, the term of this patent is extended or adjusted under 35 U.S.C. 154(b) by 245 days.

(21) Appl. No.: 16/867,582

(22) Filed: May 6, 2020

(65) Prior Publication Data

US 2020/0390063 A1 Dec. 17, 2020

(30) Foreign Application Priority Data

Jun. 11, 2019 (CN) .......................... 201910503741.4

(51) Int. Cl.
*A01K 15/02* (2006.01)
*A01K 27/00* (2006.01)

(52) U.S. Cl.
CPC .......... *A01K 15/022* (2013.01); *A01K 15/029* (2013.01); *A01K 27/009* (2013.01)

(58) Field of Classification Search
CPC .. A01K 15/022; A01K 15/029; A01K 27/009; A01K 15/027; A01K 29/005
See application file for complete search history.

(56) References Cited

U.S. PATENT DOCUMENTS

| 5,927,233 | A | 7/1999 | Mainini et al. |
| 6,431,121 | B1 | 8/2002 | Mainini et al. |
| 6,487,992 | B1 | 12/2002 | Hollis |
| 6,598,563 | B2 | 7/2003 | Kim et al. |
| 6,637,376 | B2 | 10/2003 | Lee, IV |

(Continued)

FOREIGN PATENT DOCUMENTS

| CN | 202435941 U | 9/2012 |
| CN | 101984788 B | 2/2013 |

(Continued)

OTHER PUBLICATIONS

First Office Action in Chinese Application No. 201910503741.4 dated Jan. 5, 2021, 9 pages.

*Primary Examiner* — Joshua J Michener
*Assistant Examiner* — Nicole Paige Maccrate
(74) *Attorney, Agent, or Firm* — Metis IP LLC

(57) ABSTRACT

The present disclosure relates to systems and methods for controlling the barking of an animal that wears a monitoring device. The systems may obtain status information of the animal from the monitoring device, and determine whether the animal is barking based on the status information. The systems may also obtain a first audio signal representing a first sound from the monitoring device in response to a determination that the animal is barking, and determine whether an anti-bark operation needs to be performed on the animal based on the first audio signal. The systems may further cause the monitoring device to perform the anti-bark operation on the animal in response to a determination that the anti-bark operation needs to be performed on the animal.

18 Claims, 11 Drawing Sheets

(56) References Cited

U.S. PATENT DOCUMENTS

| | | | |
|---|---|---|---|
| 6,668,760 | B2 | 12/2003 | Groh et al. |
| 6,928,958 | B2 | 8/2005 | Crist et al. |
| 7,222,589 | B2 | 5/2007 | Lee, IV et al. |
| 7,252,051 | B2 | 8/2007 | Napolez et al. |
| 7,900,585 | B2 | 3/2011 | Lee, IV et al. |
| 8,161,915 | B2 | 4/2012 | Kim |
| 8,281,749 | B2 | 10/2012 | Dukes |
| 8,342,134 | B2 | 1/2013 | Lee, IV et al. |
| 8,438,999 | B2 | 5/2013 | Hardi et al. |
| 8,714,113 | B2 | 5/2014 | Lee, IV |
| 9,675,051 | B2 * | 6/2017 | Bonge, Jr. ............... H04W 4/12 |
| 9,943,067 | B2 | 4/2018 | Mainini |
| 10,064,391 | B1 | 9/2018 | Riley |
| 2018/0249680 | A1 | 9/2018 | Van Curen et al. |

FOREIGN PATENT DOCUMENTS

| | | | |
|---|---|---|---|
| CN | 103271727 | A | 9/2013 |
| CN | 105997015 | A | 10/2016 |
| CN | 108812405 | A | 11/2018 |
| CN | 109479753 | A | 3/2019 |

\* cited by examiner

METHODS AND SYSTEMS FOR CONTROLLING THE BARKING OF AN ANIMAL

CROSS-REFERENCE TO RELATED APPLICATIONS

This application claims priority to Chinese Patent Application No. 201910503741.4, filed on Jun. 11, 2019, the contents of which are hereby incorporated by reference.

TECHNICAL FIELD

The present disclosure generally relates to animal monitoring, and in particular, to methods and systems for controlling barking of an animal.

BACKGROUND

A plurality of animal control devices have been developed in order to monitor and correct some actions of animals. For example, a commonly used barking control device of dogs may include a remote controller hold by an operator (e.g., an owner of a dog) and a receiver worn by the dog, wherein the operator may need to manually input a control signal via the remote controller to cause the receiver to apply a correction operation (e.g., generate a vibration, an electric shock, etc.) if the dog is barking. This is not only time consuming but also needs human effort. Automatic barking control devices may be able to detect a dog barking and perform a correction operation automatically, but be susceptible to environmental noises. For example, noises having a similar frequency and intensity to a dog barking may be wrongly detected as a dog barking by the automatic barking control device. Thus, it is desirable to provide systems and methods for controlling animal barking in a more efficient and accurate way.

SUMMARY

According to an aspect of the present disclosure, a system for controlling barking of an animal that wears a monitoring device is provided. The system may include at least one storage device including a set of instructions and at least one processor configured to communicate with the at least one storage device. When executing the set of instructions, the at least one processor may be configured to direct the system to perform the following operations. The system may obtain status information of the animal from the monitoring device, and determine whether the animal is barking based on the status information. The system may also obtain a first audio signal representing a first sound from the monitoring device in response to a determination that the animal is barking, and determine whether an anti-bark operation needs to be performed on the animal based on the first audio signal. The system may further cause the monitoring device to perform the anti-bark operation on the animal in response to a determination that the anti-bark operation needs to be performed on the animal.

In some embodiments, the monitoring device may include an audio sensor. The status information may include a second audio signal representing a second sound acquired by the audio sensor. The determining whether the animal is barking may include obtaining one or more first voiceprint features of the animal, determining one or more second voiceprint features of the second sound based on the second audio signal, determining whether the second sound is made by the animal based on the one or more first voiceprint features and the one or more second voiceprint features, and determining that the animal is barking in response a determination that the second sound is made by the animal.

In some embodiments, the one or more first voiceprint features may include at least one of a tone, a pitch, a length, a sound intensity, a sound frequency, a rhythm, a linear prediction coefficients feature, a perceptual linear predictive feature, a Tandem feature, a linear predictive cepstral coefficient feature, a Mel frequency cepstrum coefficient feature, a deep feature, or a power-normalized cepstral coefficient feature.

In some embodiments, the monitoring device may include a motion sensor. The status information of the animal may include a motion signal indicating a motion parameter of a mouth or a neck of the animal. The determining whether the animal is barking may include determining whether the motion parameter of the mouth or the neck of the animal exceeds a first threshold value based on the motion signal, and determining that the animal is barking in response to a determination that the motion of the mouth or the neck of the animal exceeds a first threshold value.

In some embodiments, the monitoring device may include a physiological sensor. The status information of the animal may include a physiological signal indicating a physiological parameter of the animal. The determining whether the animal is barking may include determining whether the physiological parameter of the animal exceeds a second threshold value based on the physiological parameter, and determining that the animal is barking in response to a determination that the physiological parameter of the animal exceeds the second threshold value.

In some embodiments, the determining whether an anti-bark operation needs to be performed on the animal may include determining an acoustic feature value of the first sound based on the first audio signal, determining whether the acoustic feature value is greater than a third threshold value, and determining that the anti-bark operation needs to be performed on the animal in response to a determination that the acoustic feature value is greater than the third threshold value.

In some embodiments, the determining an acoustic feature value of the first sound may include extracting a target audio signal that represents a target sound made by the animal from the first audio signal, and determining an acoustic feature value of the target sound based on the target audio signal as the acoustic feature value of the first sound.

In some embodiments, the system may further include determining the third threshold value based on at least one of a characteristic of the animal or an environment of the animal.

In some embodiments, the performing the anti-bark operation may include causing the monitoring device to generate at least one of a sound, a vibration, an electric shock, a light, an ultrasound, or spray.

According to another aspect of the present disclosure, a method for controlling barking of an animal that wears a monitoring device is provided. The method may include obtaining status information of the animal from the monitoring device, and determining whether the animal is barking based on the status information. The method may also include obtaining a first audio signal representing a first sound from the monitoring device in response to a determination that the animal is barking, and determining whether an anti-bark operation needs to be performed on the animal based on the first audio signal. The method may further include causing the monitoring device to perform the anti-bark operation on the animal in response to a determination that the anti-bark operation needs to be performed on the animal.

According to yet another aspect of the present disclosure, a non-transitory computer readable medium comprising a set of instructions for controlling barking of an animal that wears a monitoring device is provided. When executed by at least one processor, the set of instructions may direct the at least one processor to effectuate a method. The method may include obtaining status information of the animal from the monitoring device, and determining whether the animal is barking based on the status information. The method may also include obtaining a first audio signal representing a first sound from the monitoring device in response to a determination that the animal is barking, and determining whether an anti-bark operation needs to be performed on the animal based on the first audio signal. The method may further include causing the monitoring device to perform the anti-bark operation on the animal in response to a determination that the anti-bark operation needs to be performed on the animal.

According to yet another aspect of the present disclosure, a system for controlling barking of an animal that wears a monitoring device is provided. The system may include an obtaining module configured to obtain status information of the animal from the monitoring device. The system may include a determination module configured to determine whether the animal is barking based on the status information. The obtaining module may be further configured to obtain a first audio signal representing a first sound from the monitoring device in response to a determination that the animal is barking. The determination module may be further configured to determine whether an anti-bark operation needs to be performed on the animal based on the first audio signal. The system may also include a control module configured to cause the monitoring device to perform the anti-bark operation on the animal in response to a determination that the anti-bark operation needs to be performed on the animal.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

In the following detailed description, numerous specific details are set forth by way of examples in order to provide a thorough understanding of the relevant disclosure. However, it should be apparent to those skilled in the art that the present disclosure may be practiced without such details. In other instances, well known methods, procedures, systems, components, and/or circuitry have been described at a relatively high-level, without detail, in order to avoid unnecessarily obscuring aspects of the present disclosure. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but to be accorded the widest scope consistent with the claims.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprise," "comprises," and/or "comprising," "include," "includes," and/or "including," when used in this specification, specify the presence of stated features, integers, steps, operations, elements, and/or components, but do not preclude the presence or addition of one or more other features, integers, steps, operations, elements, components, and/or groups thereof.

It will be understood that the term "system," "unit," "module," and/or "block" used herein are one method to distinguish different components, elements, parts, sections or assembly of different levels in ascending order. However, the terms may be displaced by another expression if they achieve the same purpose.

Figure 2:
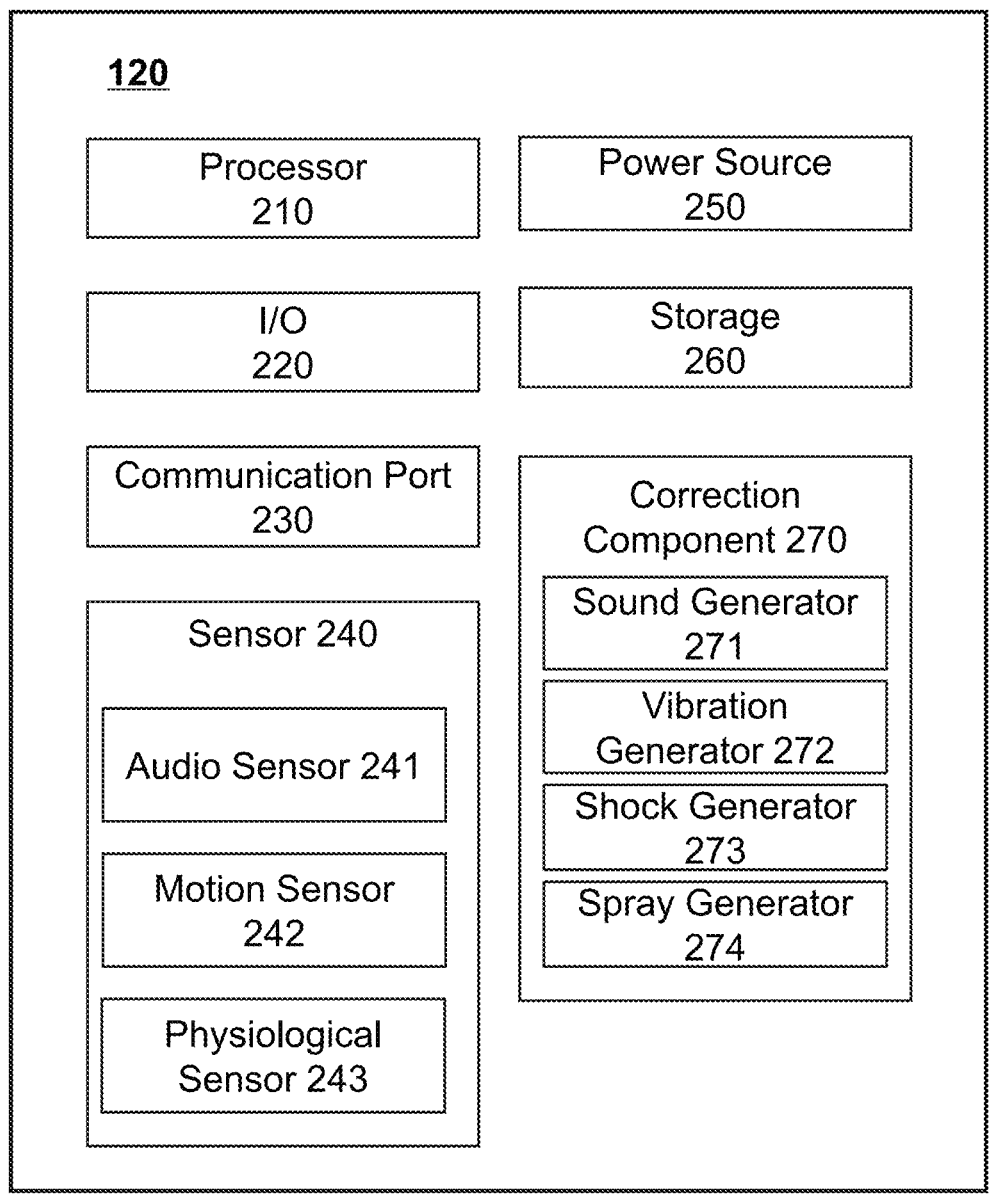
FIG. 2 is a block diagram illustrating an exemplary monitoring device according to some embodiments of the present disclosure.

Generally, the word "module," "unit," or "block," as used herein, refers to logic embodied in hardware or firmware, or to a collection of software instructions. A module, a unit, or a block described herein may be implemented as software and/or hardware and may be stored in any type of non-transitory computer-readable medium or another storage device. In some embodiments, a software module/unit/block may be compiled and linked into an executable program. It will be appreciated that software modules can be callable from other modules/units/blocks or from themselves, and/or may be invoked in response to detected events or interrupts. Software modules/units/blocks configured for execution on computing devices (e.g., processor 210 as illustrated in FIG. 2) may be provided on a computer readable medium, such as a compact disc, a digital video disc, a flash drive, a magnetic disc, or any other tangible medium, or as a digital download (and can be originally stored in a compressed or installable format that needs installation, decompression, or decryption prior to execution). Such software code may be stored, partially or fully, on a storage device of the executing computing device, for execution by the computing device. Software instructions may be embedded in firmware, such as an EPROM. It will be further appreciated that hardware modules/units/blocks may be included of connected logic components, such as gates and flip-flops, and/or can be included of programmable units, such as programmable gate arrays or processors. The modules/units/blocks or computing device functionality described herein may be implemented as software modules/units/blocks, but may be represented in hardware or firmware. In general, the modules/units/blocks described herein refer to logical modules/units/blocks that may be combined with other modules/units/blocks or divided into sub-modules/sub-units/sub-blocks despite their physical organization or storage.

It will be understood that, although the terms "first," "second," "third," etc., may be used herein to describe various elements, these elements should not be limited by these terms. These terms are only used to distinguish one element from another. For example, a first element could be termed a second element, and, similarly, a second element could be termed a first element, without departing from the scope of example embodiments of the present invention.

These and other features, and characteristics of the present disclosure, as well as the methods of operation and functions of the related elements of structure and the combination of parts and economies of manufacture, may become more apparent upon consideration of the following description with reference to the accompanying drawings, all of which form a part of this disclosure. It is to be expressly understood, however, that the drawings are for the purpose of illustration and description only and are not intended to limit the scope of the present disclosure. It is understood that the drawings are not to scale.

Moreover, while the systems and methods disclosed in the present disclosure are described primarily regarding controlling barking of an animal in an animal control system. It should be understood that this is only one exemplary embodiment. The systems and methods of the present disclosure may be applied to control one or more other behaviors of an animal. For example, the systems and methods of the present disclosure may be applied to prevent the animal from moving into an off-limit area, correct an aggressive action toward humans or other animals, train the animal, or the like, or any combination thereof.

An aspect of the present disclosure relates to systems and methods for controlling barking of an animal. The systems and methods may obtain status information of the animal from a monitoring device, and determine whether the animal is barking based on the status information of the animal. In response to a determination that the animal is barking, the systems and methods may obtain a first audio signal representing a first sound of the animal from the monitoring device. The systems and method may determine whether an anti-bark operation needs to be performed on the animal based on the first audio signal. In response to a determination that the anti-bark operation needs to be performed on the animal, the systems and methods may cause the monitoring device to perform the anti-bark operation on the animal.

According to some embodiments of the present disclosure, the status information may include a second audio signal representing a second sound, a motion signal, a physiological signal, or the like, or any combination thereof. The systems and methods may verify whether the animal is barking (i.e., verify the identity of the animal) before performing an anti-barking operation. For example, the systems and methods may compare one or more first voiceprint features of the animal with one or more second voiceprint features of the second sound to determine whether the second sound is made by the animal. Conventional barking control devices normally determine whether an animal is barking based on an intensity of an audio signal without confirming whether the audio signal is generated by the animal, which may be susceptible to environmental noises having a similar frequency and/or intensity to the animal barking, and cause a misjudgment. By determining whether the animal is barking based on the status information, the systems and methods for controlling barking may avoid misjudgment, and improve the efficiency and accuracy of animal control.

Figure 1:
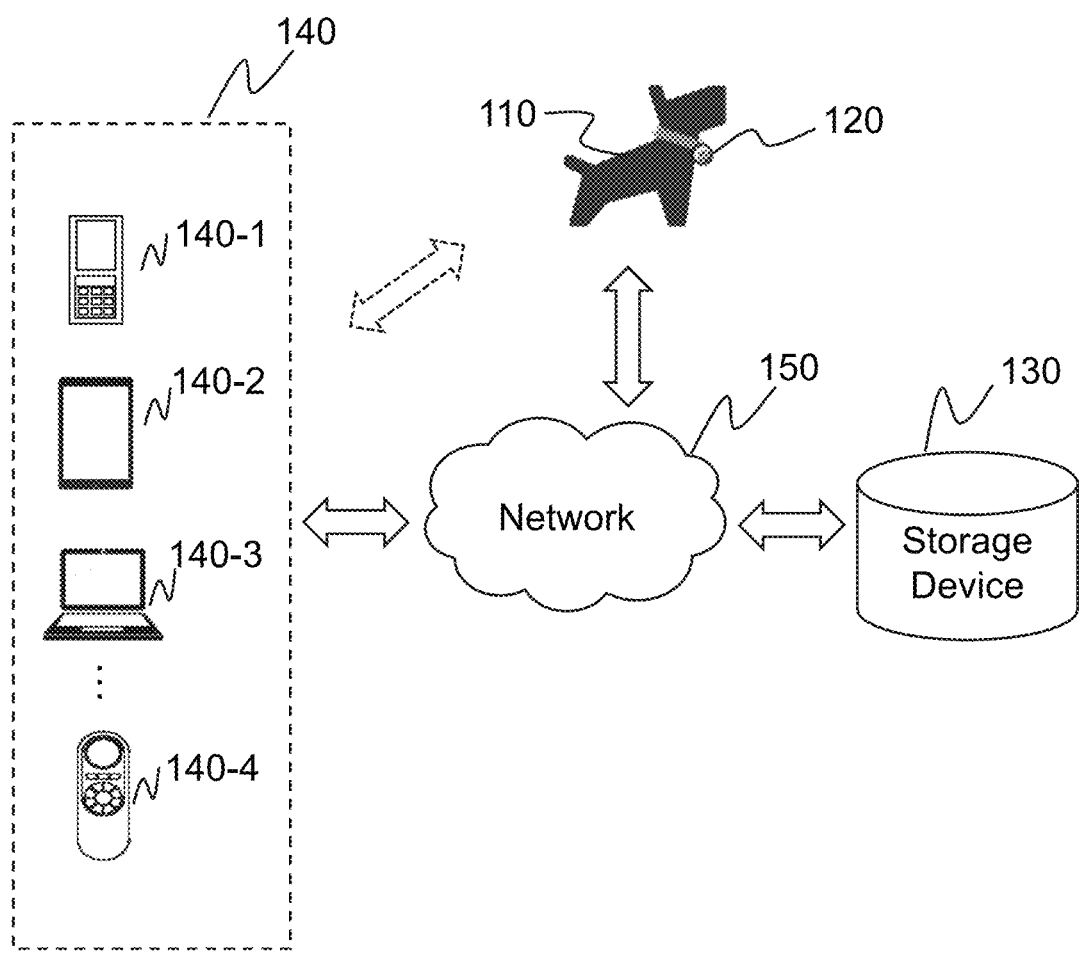
FIG. 1 is a schematic diagram illustrating an exemplary animal control system according to some embodiments of the present disclosure.

FIG. 1 is a schematic diagram illustrating an exemplary animal control system 100 according to some embodiments of the present disclosure. The animal control system 100 may be used to monitor, control, and/or train an animal 110, such as a dog, a cat, a horse, a bird, a pig, a rabbit, or the like, or any combination thereof. In some embodiments, the animal control system 100 may be used to control and/or correct one or more unwelcome actions of the animal 110 including, for example, barking, jumping, moving into an off-limit area, exhibiting an aggressive action toward human or other animals, or the like, or any combination thereof. For illustration purposes, the present disclosure is described with reference to systems and methods for control and/or correct animal barking, and not intended to limit the scope of the present disclosure.

As shown in FIG. 1, the animal control system 100 may include a monitoring device 120 worn on the animal 110, a storage device 130, one or more terminals 140, and a network 150. In some embodiments, the monitoring device 120, the storage device 130, and/or the terminal(s) 140 may be connected to and/or communicate with each other via a wireless connection, a wired connection, or a combination thereof. The connections between the components in the animal control system 100 may be variable. For example, the monitoring device 120 may be connected to the terminal(s) 140 through the network 150. As another example, the monitoring device 120 may be connected to the terminal(s) 140 directly.

The monitoring device 120 may be configured to monitor the animal 110 and optionally apply one or more correction operations on the animal 110 if the animal 110 performs an unwelcome action. For example, the monitoring device 120 may include a sensor, a processor, and a correction component. The sensor may be configured to obtain status information relating to the animal 110, such as audio information, motion information, physiological information, etc. The processor may be configured to analyze the status information of the animal 110 to detect an occurrence of unwelcome actions. The correction component may be configured to perform one or more correction operations (e.g., generate a vibration or an electric shock) on the animal 110 if the animal 110 exhibits an unwelcome behavior.

In some embodiments, the monitoring device 120 may be configured as a wearable device, an implanted device, etc. The monitoring device 120 may be worn on or implanted into any portion of the animal 110. For example, exemplary wearable devices may include a bracelet, a footgear, a glass, a helmet, a watch, clothing, a backpack, an accessory, a strap, a collar, a harness, or the like, or any combination thereof. More descriptions regarding the monitoring device 120 may be found elsewhere in the present disclosure. See, e.g., FIGS. 2 and 3 and relevant descriptions thereof.

The storage device 130 may store data, instructions, and/or any other information. In some embodiments, the storage device 130 may store data obtained from the monitoring device 120 and/or the terminal(s) 140. For example, the storage device 130 may store status information of the animal 110 received from the monitoring device 120, identity (or profile) information (e.g., a weight, a type, a height, an age, a name, etc.) of the animal 110, historical behavior information (e.g., historical audio information, historical motion information, etc.) of the animal 110, or the like, or any combination thereof.

In some embodiments, the storage device 130 may store data, program, and/or instructions that the processor may execute or use to perform exemplary methods described in the present disclosure. For example, the storage device 130 may store instructions for a processor of the monitoring device 120 or an independent processor to perform to control barking of the animal 110. In some embodiments, the storage device 130 may include a mass storage device, a removable storage device, a volatile read-and-write memory, a read-only memory (ROM), or the like, or a combination thereof. Exemplary mass storage devices may include a magnetic disk, an optical disk, a solid-state drive, etc. Exemplary removable storage devices may include a flash drive, a floppy disk, an optical disk, a memory card, a zip disk, a magnetic tape, etc. Exemplary volatile read-and-write memory may include a random access memory (RAM). Exemplary RAM may include a dynamic RAM (DRAM), a double date rate synchronous dynamic RAM (DDR SDRAM), a static RAM (SRAM), a thyristor RAM (T-RAM), a zero-capacitor RAM (Z-RAM), etc. Exemplary ROM may include a mask ROM (MROM), a programmable ROM (PROM), an erasable programmable ROM (EPROM), an electrically erasable programmable ROM (EEPROM), a compact disk ROM (CD-ROM), a digital versatile disk ROM, etc. In some embodiments, the storage device 130 may be implemented on a cloud platform as described elsewhere in the disclosure.

In some embodiments, the storage device 130 may be connected to the network 150 to communicate with one or more other components (e.g., the monitoring device 120 and/or the terminal(s) 140) in the animal control system 100. One or more components of the animal control system 100 may access the data or instructions stored in the storage device 130 via the network 150. In some embodiments, the storage device 130 may be part of the monitoring device 120 or the terminal(s) 140.

The terminal(s) 140 may be configured to enable a user interaction between a user and the animal control system 100. For example, the terminal(s) 140 may receive an instruction from the user to cause the monitoring device 120 to monitor the animal 110 or apply a correction action on the animal 110. As another example, the terminal(s) 140 may receive a monitoring result (e.g., an occurrence of an unwelcome action of the animal 110) from the monitoring device 120, and display the monitoring result to the user, and optionally generate an alarm (e.g., a sound, light, message) regarding the monitoring result. In some embodiments, the terminal(s) 140 may be connected to and/or communicate with the monitoring device 120 and/or the storage device 130. For example, the terminal(s) 140 may transmit an instruction inputted by the user to the monitoring device 120 to remotely control the monitoring device 120. In some embodiments, the terminal(s) 140 may include a mobile device 140-1, a tablet computer 140-2, a laptop computer 140-3, a remote-control device 140-4, or the like, or a combination thereof. For example, the mobile device 140-1 may include a mobile phone, a personal digital assistant (PDA), a gaming device, a navigation device, a point of sale (POS) device, a laptop, a tablet computer, a desktop, or the like, or a combination thereof.

In some embodiments, the terminal(s) 140 may include an input device, an output device, etc. The input device may include alphanumeric and other keys that may be input via a keyboard, a touch screen (for example, with haptics or tactile feedback), a speech input, an eye tracking input, a brain monitoring system, or any other comparable input mechanism. The input information received through the input device may be transmitted to the processor 210 via, for example, a bus, for further processing. Other types of the input device may include a cursor control device, such as a mouse, a trackball, or cursor direction keys, etc. The output device may include a display, a speaker, a printer, or the like, or a combination thereof. For example, the terminal(s) 140 may include a plurality of buttons for causing the monitoring device 120 to perform different actions, e.g., train the animal 110, generate a sound, generate a vibration, apply an electrical shock, generate a spray, generate an ultrasound, or the like, or any combination thereof. In some embodiments, the terminal(s) 140 may be part of the monitoring device 110.

The network 150 may include any suitable network that can facilitate the exchange of information and/or data for the animal control system 100. In some embodiments, one or more components of the animal control system 100 (e.g., the monitoring device 120, the storage device 130, the terminal(s) 140, etc.) may communicate information and/or data with each other via the network 150. For example, the monitoring device 120 may obtain user instruction(s) from the terminal(s) 140 via the network 150. As another example, the monitoring device 120 may receive information and/or data (e.g., identity information of the animal 110) from the storage device 130 via the network 150. The network 150 may include a public network (e.g., the Internet), a private network (e.g., a local area network (LAN), a wide area network (WAN)), etc.), a wired network (e.g., an Ethernet network), a wireless network (e.g., an 802.11 network, a Wi-Fi network, etc.), a cellular network (e.g., a Long Term Evolution (LTE) network), a frame relay network, a virtual private network ("VPN"), a satellite network, a telephone network, routers, hubs, switches, server computers, or the like, or a combination thereof. For example, the network 150 may include a cable network, a wireline network, a fiber-optic network, a telecommunications network, an intranet, a wireless local area network (WLAN), a metropolitan area network (MAN), a public telephone switched network (PSTN), a Bluetooth™ network, a ZigBee™ network, a near field communication (NFC) network, or the like, or a combination thereof. In some embodiments, the network 150 may include one or more network access points. For example, the network 150 may include wired and/or wireless network access points such as base stations and/or internet exchange points through which one or more components of the animal control system 100 may be connected to the network 150 to exchange data and/or information.

This description is intended to be illustrative, and not to limit the scope of the present disclosure. Many alternatives, modifications, and variations will be apparent to those skilled in the art. The features, structures, methods, and characteristics of the exemplary embodiments described herein may be combined in various ways to obtain additional and/or alternative exemplary embodiments. In some embodiments, the animal control system 100 may include one or more additional components, such as a processing device configured to process information and/or data relating to the animal control system 100. The processing device may be an independent device or be part of a component of the animal control system 100 described above (e.g., the monitoring device 120). Additionally or alternatively, one or more components of the animal control system 100 may be omitted or replaced by another device that can realize the same or similar function. In some embodiments, two or more components of the animal control system 100 may be integrated into a single component. However, those variations and modifications do not depart the scope of the present disclosure.

FIG. 2 is a block diagram illustrating an exemplary monitoring device 120 according to some embodiments of the present disclosure. The monitoring device 120 may be worn on an animal, and configured to monitor and/or control the animal. As illustrated in FIG. 2, the monitoring device 120 may include a processor 210, an I/O 220, a communication port 230, one or more sensors 240, a power source 250, a storage 260, and one or more correction components 270. In some embodiments, two or more components of the monitoring device 120 may be connected to and/or communicate with each other via a wireless connection, a wired connection, or a combination thereof.

The processor 210 may execute computer instructions (or program code) and, when executing the instructions, cause the monitoring device 120 to perform functions of the monitoring device 120 in accordance with techniques described herein. The computer instructions may include, for example, routines, programs, objects, components, signals, data structures, procedures, modules, and functions, which perform particular functions described herein. For example, the processor 210 may obtain status information of the animal to be monitored (e.g., the animal 110) from the sensor(s) 240, and determine whether the animal is barking based on the status information. As another example, the processor 210 may generate the instruction for causing the correction component(s) 270 to perform an anti-barking operation to the animal. As yet another example, the processor 210 may obtain an audio signal from the sensor(s) 240, and determine one or more voiceprint features based on the audio signal.

In some embodiments, the processor 210 may include one or more hardware processors, such as a microcontroller, a microprocessor, a reduced instruction set computer (RISC), an application specific integrated circuits (ASICs), an application-specific instruction-set processor (ASIP), a central processing unit (CPU), a graphics processing unit (GPU), a physics processing unit (PPU), a microcontroller unit, a digital signal processor (DSP), a field programmable gate array (FPGA), an advanced RISC machine (ARM), a programmable logic device (PLD), any circuit or processor capable of executing one or more functions, or the like, or any combinations thereof.

Merely for illustration, only one processor is described in the monitoring device 120. However, it should be noted that the monitoring device 120 in the present disclosure may also include multiple processors. Thus operations and/or method steps that are performed by one processor as described in the present disclosure may also be jointly or separately performed by the multiple processors. For example, if in the present disclosure the processor of the monitoring device 120 executes both operation A and operation B, it should be understood that operation A and operation B may also be performed by two or more different processors jointly or separately in the monitoring device 120 (e.g., a first processor executes process A and a second processor executes process B, or the first and second processors jointly execute operations A and B).

The I/O 220 may input or output signals, data, and/or information. For example, a user may input an instruction and/or information relating the animal via the I/O 220. As another example, the I/O 220 may output an alarm (e.g., a sound, a light) if it is detected that the animal exhibits an unwelcome behavior. In some embodiments, the I/O 220 may enable user interaction with the monitoring device 120. In some embodiments, the I/O 220 may include an input device and an output device. Exemplary input devices may include a keyboard, a mouse, a touch screen, a microphone, or the like, or a combination thereof. Exemplary output devices may include a display device, a loudspeaker, a printer, a projector, or the like, or a combination thereof. Exemplary display devices may include a liquid crystal display (LCD), a light-emitting diode (LED)-based display, a flat panel display, a curved screen, a television device, a cathode ray tube (CRT), or the like, or a combination thereof.

In some embodiments, the I/O 220 may include a display configured to display information relating to the animal and/or the monitoring device 120. The displayed information may include status information of the animal, whether the animal is barking or not, an operating status of the monitoring device 120, an alarm message, or the like, or any combination thereof. The information may be displayed in any form, for example, as a text description, a voice description, an audio description, a graphical illustration, etc.

The communication port 230 may be connected to a network (e.g., the network 150) to facilitate data communications. The communication port 230 may establish connections between two or more components of the monitoring device 120 and/or between a component of the monitoring device 120 and another component of the animal control system 100 (e.g., the terminal(s) 140, the storage device 130). The connection may be a wired connection, a wireless connection, or a combination of both that enables data transmission and reception. The wired connection may include an electrical cable, an optical cable, a telephone wire, or the like, or any combination thereof. The wireless connection may include Bluetooth, Wi-Fi, WiMAX, WLAN, ZigBee, mobile network (e.g., 3G, 4G, 5G, etc.), or the like, or a combination thereof. In some embodiments, the communication port 230 may be a standardized communication port, such as RS232, RS485, etc. In some embodiments, the communication port 230 may be a specially designed communication port.

The sensor(s) 240 may be configured to obtain status information including, for example, location information, motion information, sound information, environmental information, physiological information, or the like, or any combination thereof, of the animal. The sensor(s) 240 may include any type of sensors. For example, as shown in FIG.

2, the sensor(s) 240 may include an audio sensor 241, a motion sensor 242, and a physiological sensor 243. The audio sensor 241 may be configured to detect an ambient sound of the audio sensor 241 and generate a sound signal representing the ambient sound. The ambient sound may include, for example, a sound (e.g., barking, howl) generated by the animal, a sound generated by another animal, a sound generated by a human, an environmental noise, etc. The motion sensor 242 may be configured to detect a motion of the animal (or a portion thereof) and generate a motion signal representing the motion. The motion signal may indicate or be used to determine one or more motion parameters of the animal, such as a motion direction, an acceleration, a motion velocity, a motion amplitude, a motion frequency, etc. Exemplary motion sensors may include a gyroscope, a vibration sensor, a geomagnetic sensor, an e-compass, an inertial measurement sensor, a G-sensor, or the like, or any combination thereof. In some embodiments, the motion sensor 242 may be a multi-axis motion sensor. In some embodiments, the motion sensor 242 may be mounted a specific portion of the animal and configured to detect the motion of the specific portion. For example, the motion sensor 242 may detect the motion of the neck or the mouth of the animal to determine whether the animal is barking. The physiological sensor 243 may be configured to generate one or more physiological signals indicating one or more physiological parameters of the animal. Exemplary physiological parameters may include a body temperature, a blood oxygen, a heartbeat, a blood pressure, a respiratory rate, a pulse rate, or the like, or any combination thereof.

In some embodiments, the sensor(s) 240 may be connected to and/or communicate with one or more other components of the monitoring device 120. For example, the sensor(s) 240 may obtain an instruction to detect status information of the animal from the processor 210 or the I/O 220. As another example, the sensor(s) 240 may transmit the obtained status information to the processor 210 for further process or a display for display.

The power source 250 may be configured to supply energy to one or more other components of the monitoring device 120 (e.g., the processor 210, the I/O 220, the communication port 230, the sensor(s) 240, the storage 260, and/or the correction component(s) 270). In some embodiments, the power source 250 may provide an electric power source via an energy storage device, a power generation device, or the like, or any combination thereof. In some embodiments, the energy storage device may include one or more batteries (e.g., a dry battery, a lithium battery, a Daniel battery, a fuel battery, etc.). In some embodiments, the power source 250 may be charged by an external power source or a power generation device. In some embodiments, the power source 250 may include one or more electric generators, such as a human power generation device, a photovoltaic power generation device, a heat conduction power generation device, a wind power generation device, a nuclear power generation device, etc. In some embodiments, the power source 250 may include a battery, a charging terminal, a power regulator.

The storage 260 may store data/information relating to the monitoring device 120 and/or the animal (e.g., one or more voiceprint features of the animal). In some embodiments, the storage 260 may include a mass storage device, a removable storage device, a volatile read-and-write memory, a read-only memory (ROM), or the like, or any combination thereof. In some embodiments, the storage 260 may store one or more programs and/or instructions for the processor 210 to perform exemplary methods described in the present disclosure.

The correction component(s) 270 may be configured to perform a specific operation on the animal to control actions of the animal, for example, a punishment or comfort operation if the animal exhibits an unwelcome behavior, a reward operation if the animal does not exhibit an unwelcome behavior in a preset period, or the like. For example, as shown in FIG. 2, the correction component(s) 270 may include a sound generator 271, a vibration generator 272, and a shock generator 273, and a spray generator 274. The sound generator 271 may be configured to generate and broadcast a sound for, for example, warning, training, praising, comforting the animal, stopping and/or preventing an unwelcome behavior of the animal, etc. The sound generated by the sound generator 271 may include a beep, a command (e.g., previously recorded by an owner of the animal), or the like, or any combination thereof. The vibration generator 272 may be configured to generate a vibration. The shock generator 273 may be configured to generate an electrical stimulus. In some embodiments, the shock generator 273 may be connected to one or more contact points. The one or more contact points may contact with to the animal and apply the electrical stimulus generated by the shock generator 273 to the animal. The spray generator 274 may be configured to generate and/or spray a liquid or mist. For example, the spray generator 274 may spray a mist of citronella to make the animal feel unpleasant but not painful in order to prevent a specific action (e.g., barking) of the animal. As another example, the spray generator 274 may spray a mist that makes the animal feel pleasant when the animal has a good performance.

It should be noted that the example in FIG. 2 and the description thereof is merely provided for the purposes of illustration, and not intended to limit the scope of the present disclosure. For persons having ordinary skills in the art, multiple variations and modifications may be made under the teachings of the present disclosure. In some embodiments, the monitoring device 120 may include one or more additional components or one or more components described above may be omitted. For example, one or more of the I/O 220, the communication port 230, and the storage 260 may be omitted or integrated into another component of the monitoring device 120. As another example, the correction component(s) 270 may include a light generator configured to generate a light. As still another example, the correction component(s) 270 may include an ultrasound generator configured to generate an ultrasound. In some embodiments, one or more components of the monitoring device 120 may be implemented as a device independent from the monitoring device 120. For example, the processor 210 may be a remote processor that is connected to the monitoring device 120. Merely by way of example, the processor 210 may be implemented on a cloud platform, such as a private cloud, a public cloud, a hybrid cloud, a community cloud, a distributed cloud, an inter-cloud, a multi-cloud, or the like, or a combination thereof. However, those variations and modifications do not depart from the scope of the present disclosure.

Figure 3:
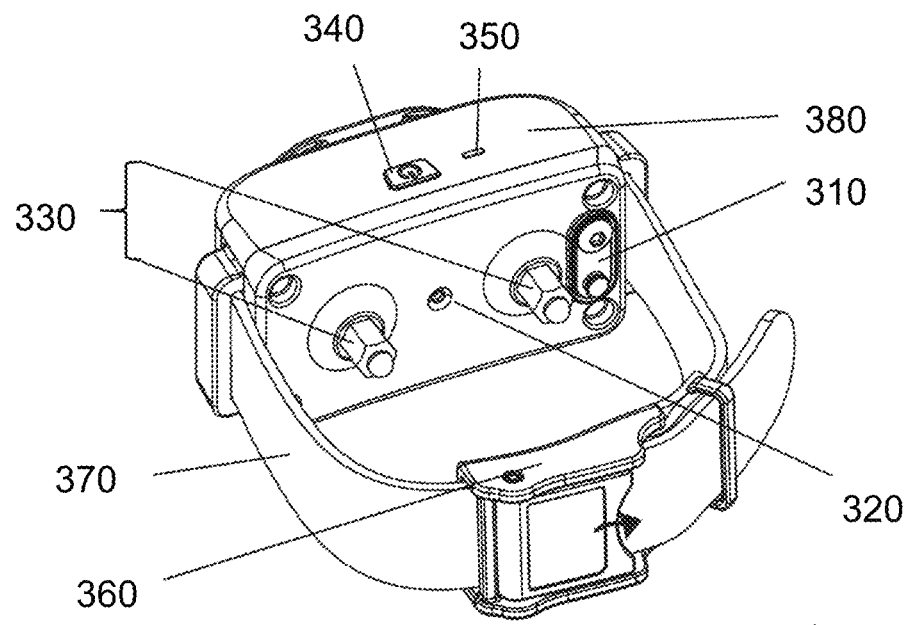
FIG. 3 is a schematic diagram illustrating an exemplary monitoring device according to some embodiments of the present disclosure.

FIG. 3 is a schematic diagram illustrating an exemplary monitoring device 300 according to some embodiments of the present disclosure. The monitoring device 300 is an exemplary embodiment of the monitoring device 120 as described elsewhere in this disclosure (e.g., FIGS. 1 and 2 and the relevant descriptions).

As shown in FIG. 3, the monitoring device 300 may be configured as a collar that may be worn on, for example, the neck, a leg, or any other suitable portion of an animal. The monitoring device 300 may include a charging port 310, an audio sensor 320, a plurality of contact points 330, an on/off button 340, an LED indicator 350, a buckle 360, a strap 370, and a processor 380.

The charging port 310 may be used to charge the monitoring device 300. For example, the charging port 310 may include a dock charging port, a direct current (DC) charging port, a universal serial bus (USB) charging port, a lightning charging port, a wireless charging port, or the like, or any combination thereof. The audio sensor 320 may have the same or similar function as the audio sensor 241 as described in connection with FIG. 2. The contact points 330 may contact with the animal that wears the monitoring device 300. For example, the contact points 330 may be part of a correction component (e.g., the vibration generator 272, the shock generator 273 as shown in FIG. 2) configured to transmit a vibration and/or an electrical shock to the animal. As another example, the contact points 330 may be part of a physiological sensor (e.g., the physiological sensor 243 as shown in FIG. 2) configured to measure one or more physiological parameters (e.g., a body temperature, a blood oxygen) of the animal.

The on/off button 340 may be configured to control an operation mode of the monitoring device 300. For example, by manipulating the on/off button 340, the operation mode of the monitoring device 300 may switch between an open mode, a shutdown mode, a sleeping mode (e.g., in a low power mode and may resume itself quickly after being woken up), or the like, or any combination thereof. In some embodiments, a user may set the mode of the monitoring device 300 by pressing the on/off button 340 or remotely controlling the on/off button 340 via a terminal that is connected to the monitoring device 300. Additionally or alternatively, the mode of the monitoring device 300 may be set automatically by the processor 380 according to, for example, a current time, a status of the animal. For example, the processor 380 may switch the operation mode of the monitoring device 300 to the sleeping mode when the animal is sleeping, thereby shutting down certain functions of the monitoring device 300 to reduce energy consumption.

The LED indicator 350 may be configured to output a light. For example, the LED indicator 350 may output a light to warn the animal, a light to indicate a status of the animal, a light to indicate an electric quantity of the monitoring device 300, or the like, or any combination thereof. The buckle 360 and strap 370 may be used to fix the monitoring device 300 on a portion, such as the neck or a leg of the animal. The size of the monitoring device 300 may be adjusted by the strap 370 and the buckle 360. The processor 380 may have the same function as or similar function to the processor 210 as described in connection with FIG. 2.

It should be noted that the example in FIG. 3 and the above description thereof is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. The monitoring device 300 may include one or more additional components, such as a display, a motion sensor, an I/O, or the like. Additionally or alternatively, one or more components of the monitoring device 300 may be omitted or replaced by another device that can implement same or similar functions. For example, the buckle 360 and strap 370 may be replaced by a clip buckle, an auto-lock buckle, a press buckle, or any other mechanism that can fix the monitoring device on the animal. In addition, the shape, size, position of a component of the monitoring device 300 as shown in FIG. 3 are illustrative and may be modified.

Figure 4:
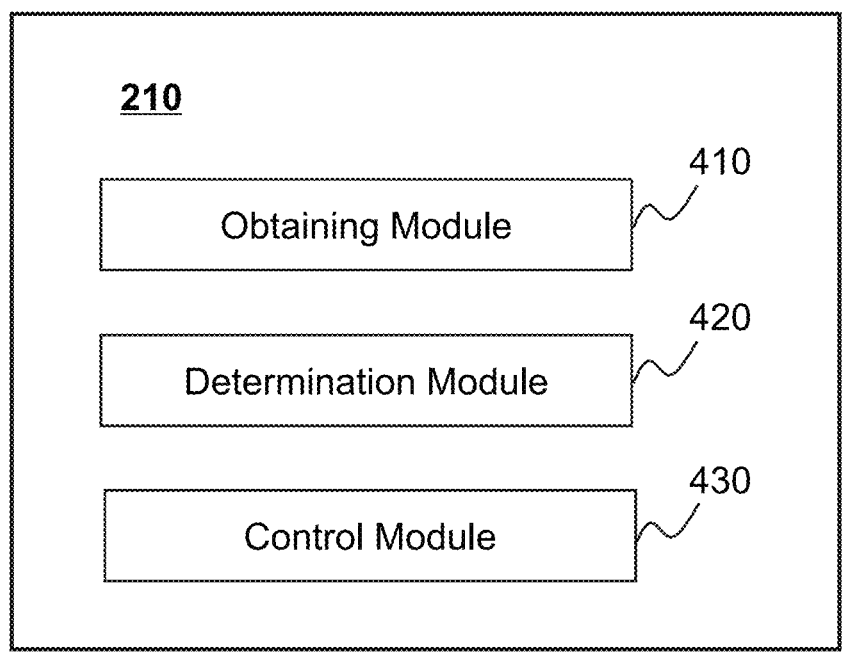
FIG. 4 is a block diagram illustrating an exemplary processor according to some embodiments of the present disclosure.

FIG. 4 is a schematic diagram illustrating an exemplary processor 210 according to some embodiments of the present disclosure. The processor 210 may include an obtaining module 410, a determination module 420, and a control module 430.

The obtaining module 410 may be configured to obtain status information of an animal from a monitoring device. The status information may include any information that may indicate a status of the animal. Exemplary status information may include an audio signal, a motion signal, a physiological signal, or the like, or any combination thereof. The obtaining module 410 may be further configured to obtain an audio signal representing a sound and/or one or more voiceprint features of the animal. The first voiceprint feature(s) of the animal refer to one or more measurable characteristics of a sound of the animal which may be used to uniquely identify the animal.

The determination module 420 may be configured to determine whether the animal is barking based on the status information. For example, the status information may include an audio signal of the animal, and the determination module 420 may determine whether the animal is barking based on the audio signal and the one or more first voiceprint features of the animal. More descriptions regarding the determination as to whether the animal is barking may be found elsewhere in the present disclosure. See, e.g., operation 504 and relevant descriptions thereof.

The control module 430 may be configured to cause the monitoring device to perform an anti-bark operation on the animal in response to a determination that the anti-bark operation needs to be performed on the animal. The anti-bark operation may include generating a vibration, an electrical shock, a spray, a sound (e.g., beep), a light, an ultrasound, or the like, or any combination thereof, that may prevent the animal from barking.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, the processor 210 may include one or more additional components (e.g., a storage module for data storing) and/or one or more components described above may be omitted. Additionally or alternatively, a module of the processor 210 may be divided into two or more separate units or a plurality of modules of the processor 210 may be integrated into a single module.

Figure 5:
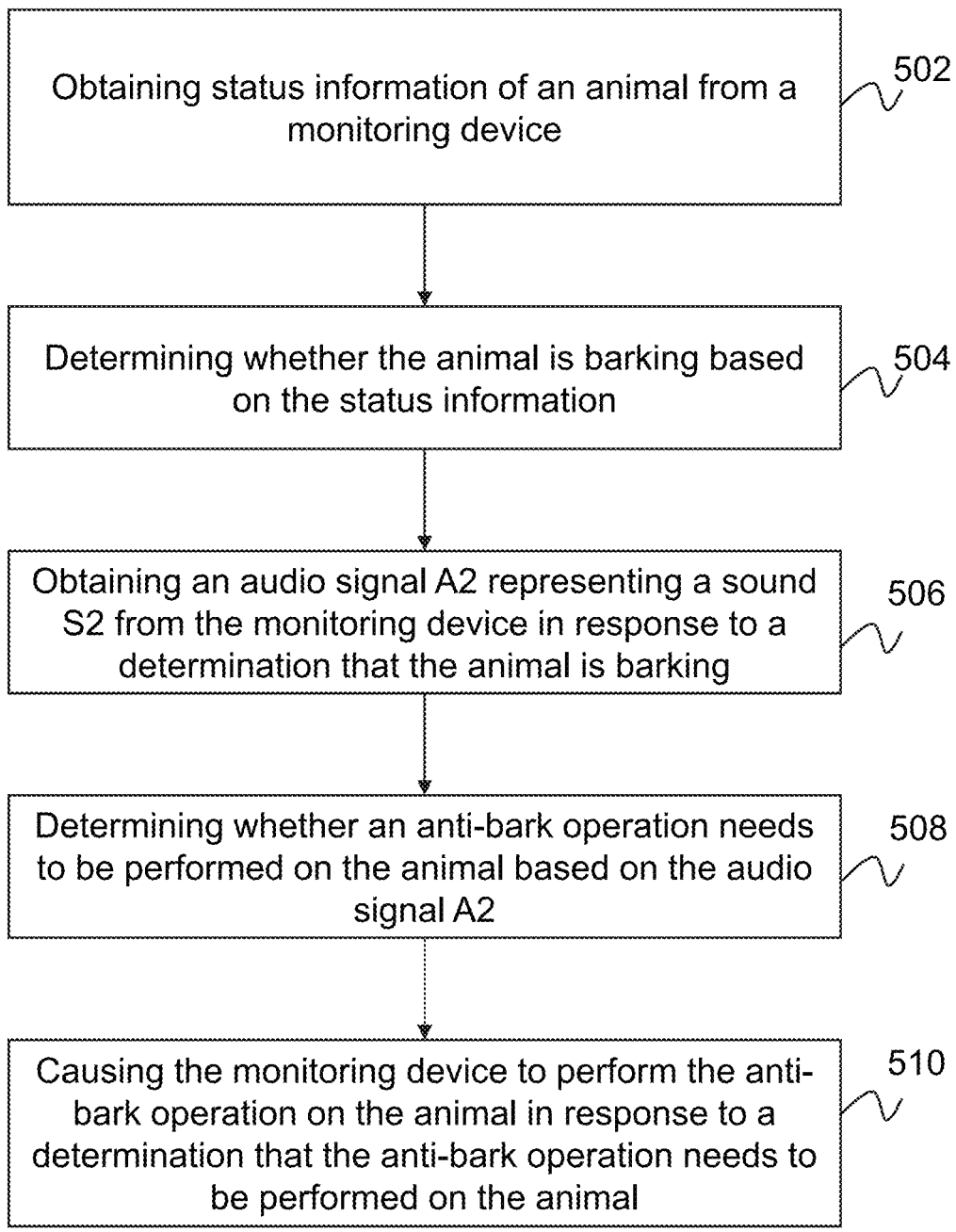
FIG. 5 is a flowchart illustrating an exemplary process for controlling barking of an animal according to some embodiments of the present disclosure.

FIG. 5 is a flowchart illustrating an exemplary process for controlling barking of an animal according to some embodiments of the present disclosure. It should be understood that barking is an exemplary behavior of the animal that needs to be controlled. Process 500 may be performed to control any other unwelcome behavior of the animal, such as jumping, moving into an off-limit area, exhibiting an aggressive action toward humans or other animals, or the like, or any combination thereof. In some embodiments, the animal may be a dog, a cat, a horse, a bird, a pig, a rabbit, or any other animal that wears a monitoring device. The monitoring device may include one or more same or similar components as the monitoring device 120 as described in connection with FIGS. 1 to 2. For example, the monitoring device may include one or more sensors (e.g., an audio sensor, a motion sensor, a physiological sensor), a processor, and one or more correction components (e.g., a sound generator, a vibration generator, a shock generator, a spray generator, etc.).

In some embodiments, the process 500 may be implemented in the animal control system 100 illustrated in FIG. 1. For example, the process 500 may be stored in a storage device (e.g., the storage device 130 illustrated in FIG. 1 and/or the storage 260 illustrated in FIG. 2) of the animal control system 100 in the form of instructions, and invoked and/or executed by a processor of the monitoring device (e.g., the processor 210 as illustrated in FIG. 2, the processor 380 of the monitoring device 300 as illustrated in FIG. 3, or one or more modules of the processor 210 as illustrated in FIG. 4). For illustration purposes, the implementation of the process 500 by the processor 210 is described as an example hereinafter.

In 502, the processor 210 (e.g., the obtaining module 410) may obtain status information of the animal from the monitoring device.

The status information may include any information that may indicate a status, such as a position, a behavior, a movement, a healthy condition, or the like, of the animal. In some embodiments, the status information may include signal(s) generated by the one or more sensors of the monitoring device. For example, the status information may include an audio signal (denoted as A1) representing a sound (denoted as S1) detected by an audio sensor (e.g., the audio sensor 241), wherein the sound S1 may be an ambient sound of the audio sensor when the audio signal A1 is generated. Additionally or alternatively, the status information may include one or more voiceprint features of the sound S1 determined based on the audio signal A1. Exemplary voiceprint features of the sound S1 may include a tone, a pitch, a length, a sound intensity, a sound frequency, a rhythm, or the like, or any combination thereof, of the sound S1. In some embodiments, the audio signal A1 representing the sound S1 may be also referred to as a second audio signal representing a second sound.

As another example, the status information may include a motion signal generated by a motion sensor (e.g., the motion sensor 242). The motion signal may indicate one or more motion parameters of a mouth or a neck of the animal. Exemplary motion parameters may include an acceleration, a motion frequency, a motion amplitude, or the like, or any combination thereof. The acceleration of the neck may include a first acceleration along a direction from the top to the bottom of the head of the animal (or referred to as an X-axis direction), a second acceleration along a direction from the right to the left of the head of the animal (or referred to as a Y-axis direction), a third acceleration along a direction from the front to the back of the head of the animal (or referred to as a Z-axis direction), or the like, or any combination thereof.

As yet another example, the status information may include a physiological signal generated by a physiological sensor (e.g., the physiological sensor 243 illustrated in FIG. 2). The physiological signal may indicate one or more physiological parameters of the animal. Exemplary physiological parameters may include a body temperature, a blood oxygen, a heartbeat, a blood pressure, a respiratory rate, a pulse rate, or the like, or any combination thereof.

In some embodiments, the monitoring device may collect and/or generate status information of the animal in real time or intermittently (e.g., periodically or irregularly), and transmit the status information to the processor 210. In response to the received status information, the processor 210 may perform the process 500 to monitor and/or control the animal.

In 504, the processor 210 (e.g., the determination module 420) may determine whether the animal is barking based on the status information.

In some embodiments, the processor 210 may determine whether the animal is barking based on the audio signal A1. For example, the processor 210 may determine one or more voiceprint features of the sound S1 based on the audio signal A1. The processor 210 may further compare the voiceprint feature(s) of the S1 with one or more voiceprint features of the animal to determine whether the animal is barking. More descriptions regarding the determination that the animal is barking based on the audio signal A1 may be found elsewhere in the present disclosure. See, e.g., FIG. 6 and the relevant description thereof.

Additionally or alternatively, the processor 210 may determine whether the animal is barking based on the motion signal indicating a motion parameter of the mouth or the neck of the animal. In some embodiments, the processor 210 may determine whether the motion parameter exceeds a first threshold value or is within a first preset range. If the motion parameter exceeds the first threshold value or is within the first preset range, the processor 210 may determine that the animal is barking. For example, when the animal is barking, the first acceleration, the second acceleration, and the third acceleration of the neck are within a range of [2 g, 4 g], [0.2 g, 1 g], and [4 g, 6 g], respectively, wherein g represents the gravitational acceleration. If one or more of the first acceleration, the second acceleration, and the third acceleration are within their respective range, it may be determined that the animal is barking.

In some embodiments, the processor 210 may determine whether the animal is barking based on a plurality of motion parameters of the animal. For example, each motion parameter may be compared with its corresponding first threshold value, and the processor 210 may determine that the animal is barking if one or more of the motion parameters exceed their respective first threshold value.

Additionally or alternatively, the processor 210 may determine whether the animal is barking based on the physiological signal indicating a physiological parameter of the animal. In some embodiments, the processor 210 may determine whether the physiological parameter of the animal exceeds a second threshold value or is within a second preset range. If the physiological parameter exceeds the corresponding second threshold value or is within the second preset range, the processor 210 may determine that the animal is barking. In some embodiments, the processor 210 may determine whether the animal is barking based on a plurality of physiological parameters of the animal. For example, each physiological parameter may be compared with its corresponding second threshold value, and the processor 210 may determine that the animal is barking if one or more of the physiological parameters exceed their respective second threshold value.

In some embodiments, a threshold value (e.g., the first or second threshold value) and/or a preset range (e.g., the first or second preset range) as aforementioned may be set by a user of the monitoring device or be a default setting of the animal control system 100. Alternatively, the threshold value and/or the preset range may be determined by one or more components of the animal control system 100. For example, the processor 210 may determine the second threshold value or the second preset range relating to a physiological parameter according to identify information of the animal (e.g., a type, a weight, a height, an age, etc.). As another example, the processor 210 may determine the second threshold value or the second preset range according to historical information of the animal. Merely by way of example, a historical blood pressure (denoted as P) in a historical period when the animal was not barking may be determined, and a second preset range of blood pressure may be determined as [1.13P, 1.28P]. If the blood pressure of the animal determined based on the physiological motion is within the range of [1.13P, 1.28P], the processor 210 may determine that the animal is barking. As another example, a historical heartbeat (denoted as H) in a historical period when the animal was not barking may be determined, a second preset range of heartbeat may be determined as [1.45H, 1.58H]. If the heartbeat of the animal determined based on the physiological motion is within the range of [1.45H, 1.58H], the processor 210 may determine that the animal is barking.

According to some embodiments of the present disclosure, the processor 210 may determine whether the animal is barking based on one or more of the audio signal, the motion signal, and the physiological signal described above. If it is determined that the animal is barking, the process 500 may proceed to operations 506 to 510. Conventional barking control devices normally determine whether an animal is barking based on an intensity of an audio signal without confirming whether the audio signal is generated by the animal, which may be susceptible to environmental noises having a similar frequency and intensity to the animal barking, and cause a misjudgment. By determining whether the animal is barking based on the status information (e.g., whether the sound S1 is made by the animal, whether the neck or mouth of the animal is moving), the methods for controlling barking may avoid the misjudgment, and improve the efficiency and accuracy of the monitoring device.

In 506, the processor 210 (e.g., the obtaining module 410) may obtain an audio signal (denoted as A2) representing a sound (denoted as S2) from the monitoring device in response to a determination that the animal is barking.

In some embodiments, after determining that the animal is barking, the processor 210 may obtain the audio signal A2 from an audio sensor of the monitoring device (e.g., a same audio sensor as or a different audio sensor from the audio sensor that generates the audio signal A1 as aforementioned). The sound S2 may be an ambient sound of the audio sensor when the audio signal A2 is generated. For example, the sound S2 may include, for example, a sound generated by the animal (also referred to as a target sound), a sound generated by another animal, a sound generated by a human, an environmental noise, or the like, or any combination thereof. In some embodiments, the audio signal A2 representing the sound S2 may be also referred to as a first audio signal representing a first sound.

In 508, the processor 210 (e.g., the determination module 420) may determine whether an anti-bark operation needs to be performed on the animal based on the audio signal A2.

An anti-bark operation refers to an operation performed on the animal to control and/or prevent the animal from barking. For example, the anti-bark operation may include generating a vibration, an electrical shock, a spray, a sound (e.g., beep), a light, an ultrasound, or the like, or any combination thereof, that may prevent the animal from barking.

In some embodiments, the processor 210 may determine an acoustic feature value of the sound S2 based on the audio signal A2. Exemplary acoustic features of the sound S2 may include a frequency, an amplitude, a phase, or the like, or any combination thereof. In some embodiments, the processor 210 may determine whether the acoustic feature value is greater than a third threshold value. The third threshold may be set by a user of the monitoring device or be a default setting of the animal control system 100. Alternatively, the third threshold may be determined by one or more components of the animal control system 100. For example, the processor 210 may determine the third threshold according to identify information of the animal (e.g., a type, a weight, a height, an age, etc.). As another example, the processor 210 may determine the third threshold according to historical information of the animal. In response to a determination that the acoustic feature value is greater than the third threshold value, the processor 210 may determine that the anti-bark operation needs to be performed on the animal.

In some embodiments, the sound S2 may include the target sound generated by the animal and optionally noises (e.g., a sound generated by another animal). In order to improve the control accuracy and avoid misjudgment, the processor 210 may extract a target audio signal representing the target sound from the audio signal A2. Taking a dog as an example, the sound frequency of a typical barking of the dog may be greater than 250 Hz and less than 2 kHz, and the pitch of the typical barking of the dog may be greater than 90 db and less than 180 db. The processor 210 may extract a portion of the audio signal A2 with the sound frequency within the range [250 Hz, 2 kHz] and/or the pitch within the range [90 db, 180 db]. The extracted portion of the audio signal A2 may be regarded as the target audio signal representing the target sound made by the dog, and the remaining portion of the audio signal A2 may be regarded as representing noises. Optionally, the extracted portion of the audio signal A2 may be processed (e.g., amplified), and the processed portion of the audio signal A2 may be regarded as the target audio signal. As another example, the processor 210 may extract the target audio signal from the audio signal A2 by filtering a portion of the audio signal A2 representing noises.

After the target audio signal is extracted, the processor 210 may determine one or more acoustic feature values of the target sound based on the target audio signal. Exemplary acoustic features of the target sound may include a frequency, an amplitude, a phase, or the like, or any combination thereof. The processor 210 may further determine whether an anti-barking operation needs to be performed on the animal based on the acoustic feature value(s). Merely by way of example, a certain acoustic feature value of the target audio signal may be compared with a corresponding third threshold value. If the acoustic feature value is greater than its corresponding third threshold value, the processor 210 may determine that the anti-bark operation needs to be performed on the animal.

In 510, the processor 210 (e.g., the control module 430) may cause the monitoring device to perform the anti-bark operation on the animal in response to a determination that the anti-bark operation needs to be performed on the animal.

In some embodiments, based on the determination that the anti-bark operation needs to be performed on the animal, the processor 210 may generate an instruction and transmit the instruction to the monitoring device. In response to the instruction, one or more correction components of the monitoring device may perform the anti-bark operation on the animal. For example, a sound generator may generate an audio command to ask the animal to stop barking. As another example, a vibration generator may generate a vibration and/or the shock generator may generate an electrical stimulus to punish the animal. Additionally or alternatively, in response to the instruction, the monitoring device may generate a notification (e.g., a sound, a light) to inform a user (e.g., an owner of the animal) that the animal is barking.

In some embodiments, in response to the determination that the anti-bark operation needs to be performed on the animal, the processor 210 may transmit a message (e.g., a text message, a voice message) to a terminal of the user to indicate that the animal is barking. Optionally, the message may inquire whether the anti-barking operation needs to be performed on the animal. Upon receiving an approval from the user, the processor 210 may transmit an instruction to the monitoring device to cause the correction component(s) of the monitoring device to perform the anti-bark operation on the animal. For example, the user may press a button of the terminal to input his/her approval regarding the anti-barking operation.

In some embodiments, the type and/or intensity of the anti-barking operation to be performed on the animal may be set by a user of the monitoring device or be a default setting of the animal control system 100. Alternatively, the type and/or intensity of the anti-barking operation may be determined by the processor 210 according to an actual need. For example, the processor 210 may determine the type and/or intensity of the anti-barking operation according to the behavior and/or the environment of the animal. Merely by way of example, an electrical stimulus may be applied on the night and an audio command may be applied in daytime, in order to avoid audio noises. As another example, the processor 210 may determine the type and/or intensity of the anti-barking operation according to the amplitude of the barking of the animal (i.e., the target sound). A stronger anti-barking operation may be performed in the amplitude of the barking of the animal is high (e.g., higher than a threshold amplitude).

As yet another example, the processor 210 may determine the type and/or intensity of the anti-barking operation according to the number of times that the animal barks. Merely by way of example, an audio command may be generated to ask the animal to stop barking when the animal barks for a first time, a vibration may be generated to distract attention of the animal when the animal barks for a second time, and an electrical stimulus may be generated to punish the animal when the animal barks for a third time, thereby improving the efficiency of the monitoring device and protecting the animal from being hurt by the anti-bark operation.

In some embodiments, in the process 500, both audio information and motion information of the animal may be collected and used for monitoring the animal. Compared with conventional approaches that merely use audio information of the animal, the methods disclosed herein may be more reliable.

It should be noted that the above descriptions regarding the process 500 are merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure.

In some embodiments, the process 500 may be accomplished with one or more additional operations not described, and/or without one or more of the operations discussed may be omitted. For example, operations 502 and 504 may be omitted. As another example, an additional operation may be implemented after 510 to transmit, to a terminal via the network 150, a notification that the anti-bark operation needs to be performed on the animal. In some embodiments, the audio signal A2 may be the same as the audio signal A1 as described in connection with operation 502.

Figure 6:
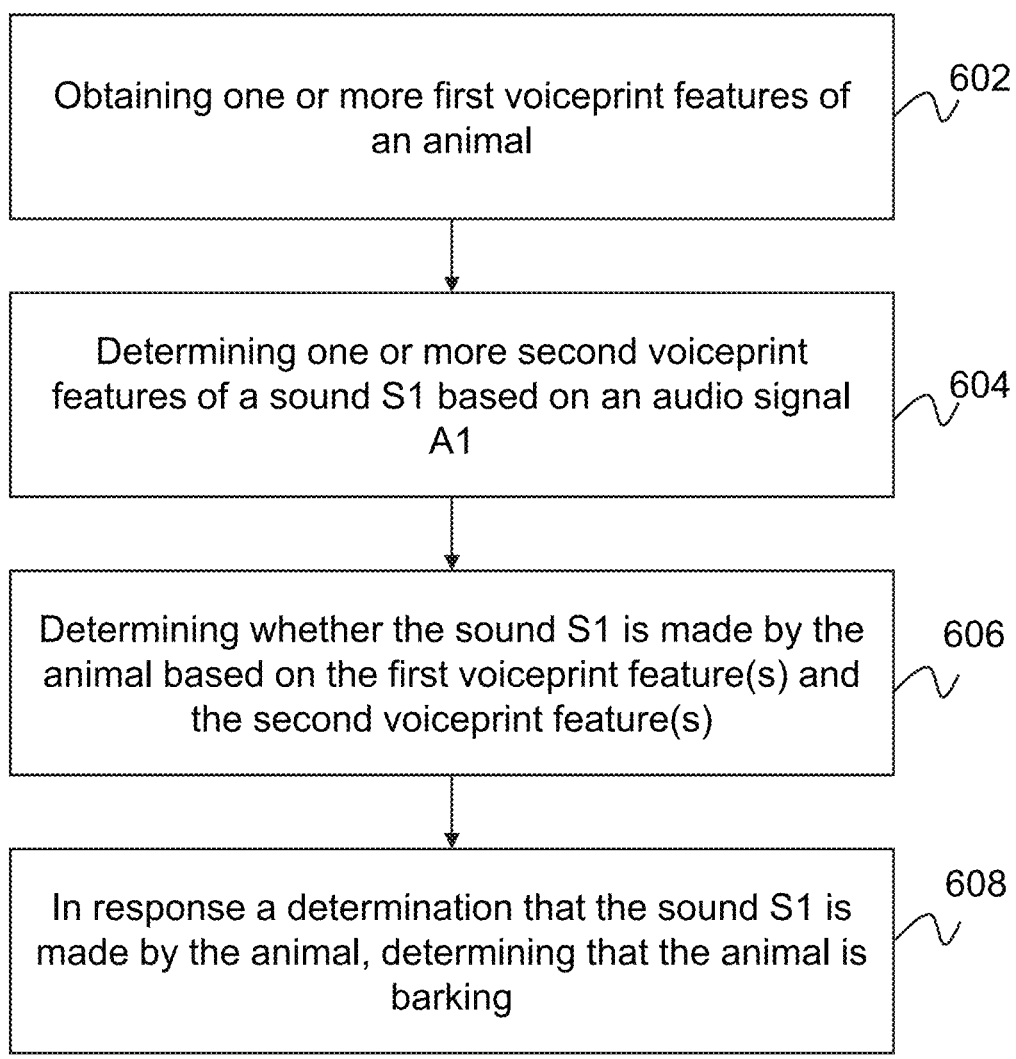
FIG. 6 is a flowchart illustrating an exemplary process for determining whether an animal is barking according to some embodiments of the present disclosure.

FIG. 6 is a flowchart illustrating an exemplary process for determining whether an animal is barking according to some embodiments of the present disclosure. In some embodiments, the process 600 may be implemented in the animal control system 100 illustrated in FIG. 1. For example, the process 600 may be stored in a storage device (e.g., the storage device 130 illustrated in FIG. 1 and/or the storage 260 illustrated in FIG. 2) of the animal control system 100 in the form of instructions, and invoked and/or executed by the processor of the monitoring device 120 (e.g., the processor 210 as illustrated in FIG. 2, the processor 380 of the monitoring device 300 as illustrated in FIG. 3, or one or more modules of the processor 210 illustrated in FIG. 4). For illustration purposes, the implementation of the process 600 by the processor 210 is described as an example hereinafter. In some embodiments, one or more operations of the process 600 may be performed to achieve at least part of operation 504 as described in connection with FIG. 5.

In 602, the processor 210 (e.g., the obtaining module 410) may obtain one or more first voiceprint features of the animal.

The first voiceprint feature(s) of the animal refer to one or more measurable characteristics of a sound of the animal which may be used to uniquely identify the animal. Exemplary first voiceprint features of the animal may include a tone, a pitch, a length, a sound intensity, a sound frequency, a rhythm, a linear prediction coefficients feature, a perceptual linear predictive (PLP) feature, a Tandem feature, a linear predictive cepstral coefficient (LPCC) feature, a Mel frequency cepstrum coefficient (MFCC) feature, a deep feature, a power-normalized cepstral coefficient (PNCC) feature, or the like, or any combination thereof, of the sound.

In some embodiments, the first voiceprint feature(s) of the animal may be previously determined and stored in a storage device (e.g., the storage device 130 and/or the storage 260) of the animal control system 100, and the processor 210 may retrieve the first voiceprint feature(s) from the storage device. For example, before the monitoring device is used, a user of the monitoring device may be required to record one or more sounds of the animal in a relatively quiet environment without noises (sounds made by other animals). The processor 210 or another computing device may determine the first voiceprint feature(s) of the animal based on the sound(s) according to an audio analysis technique, and transmit the first voiceprint feature(s) to the storage device for storing. Optionally, a plurality of types of sounds, such as a howl, a barking, a mumble, or the like, or any combination thereof, of the animal may be recorded. A plurality of sets of first voiceprint feature(s) corresponding to the different sounds of the animal may be determined and obtained in 602. In some embodiments, the processor 210 may obtain the one or more first voiceprint feature of the animal using one or more algorithms, such as an ivector-based algorithm, a DNN-based algorithm, a deep neural network algorithm, or the like, or any combination thereof.

In 604, the processor 210 (e.g., the determination module 420) may determine one or more second voiceprint features of the sound S1 based on the audio signal A1.

As described in connection with operation 502, the audio signal A1 representing the sound S1 may be generated by an audio sensor of the monitoring device. The sound S1 may be an ambient sound of the audio sensor when the audio signal A1 is generated, which may include a sound (e.g., barking, howl) generated by the animal, a sound generated by another animal, sound generated by a human, an environmental noise, or the like, or any combination thereof. The second voiceprint feature(s) of the sound S1 may include the same type of features as the first voiceprint feature(s) as described in connection with 602.

In 606, the processor 210 (e.g., the determination module 420) may determine whether the sound S1 is made by the animal based on the first voiceprint feature(s) and the second voiceprint feature(s).

In some embodiments, the processor 210 may determine a matching degree value between the first voiceprint feature(s) and the second voiceprint feature(s). The matching degree value may indicate a similarity degree between the sound S1 and the sound of the animal. The greater the matching degree value is, the more likely that the sound S1 includes a sound (e.g., a barking) of the animal. In some embodiments, if the matching degree is greater than a threshold matching degree, the processor 380 may determine that the sound S1 is made by the animal.

In 608, the processor 210 (e.g., the determination module 420) may determine that the animal is barking in response to a determination that the sound S1 is made by the animal.

It should be noted that the above descriptions regarding the process 600 are merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, the process 600 may be accomplished with one or more additional operations not described, and/or without one or more of the operations discussed may be omitted. Additionally or alternatively, the operations of the process 600 may be performed in any order. For example, operation 604 may be performed before operation 602, or operations 602 and 604 may be performed simultaneously.

Figure 7:
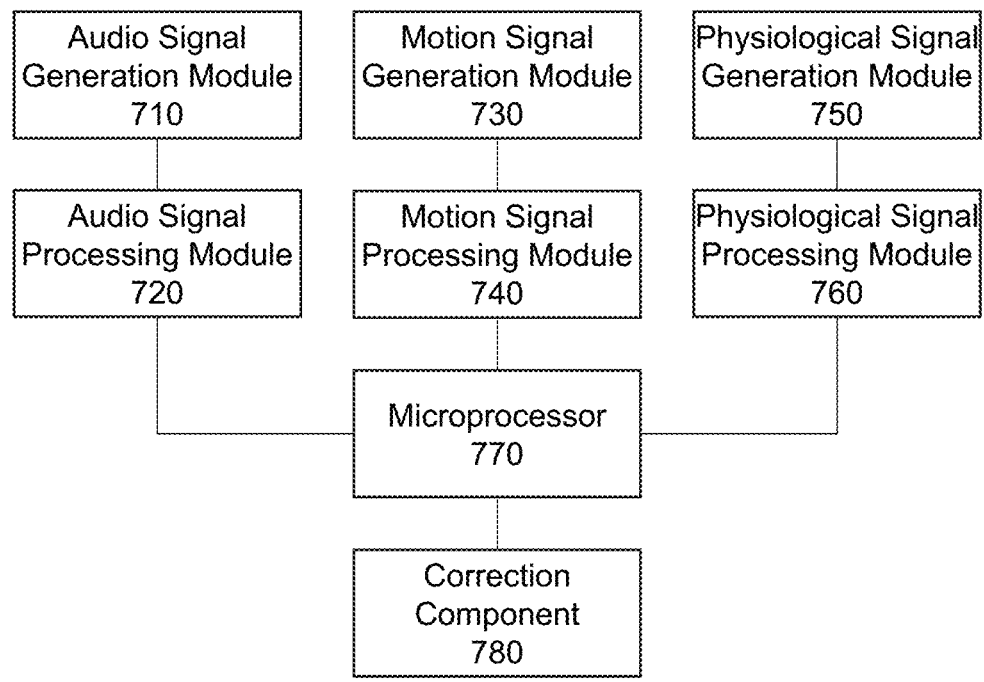
FIG. 7 is a block diagram illustrating an exemplary monitoring device according to some embodiments of the present disclosure.

FIG. 7 is a block diagram illustrating an exemplary monitoring device 700 according to some embodiments of the present disclosure. The monitoring device 700 may be an exemplary embodiment of the monitoring device 120 as described in connection with FIGS. 1 and 2.

As illustrated in FIG. 7, the monitoring device 700 may include an audio signal generation module 710, an audio signal processing module 720, a motion signal generation module 730, a motion signal processing module 740, a physiological signal generation module 750, a physiological signal processing module 760, a microprocessor 770, and a correction component 780.

The audio signal generation module 710 may be configured to detect a sound and generate an audio signal representing the sound. The audio signal generation module 710 may be electrically connected to the audio signal processing module 720 and transmit the audio signal to the audio signal processing module 720 for further processing.

The audio signal processing module 720 may be configured to process the audio signal received from the audio signal generation module 710 by performing, for example, a signal extraction, a signal amplification, a signal comparison, or the like, or any combination thereof. More descriptions regarding the audio signal processing module 720 may be found elsewhere in the present disclosure. See, e.g., FIG. 8 and the relevant description thereof.

The motion signal generation module 730 may be configured to detect a motion and generate a motion signal representing the motion. The motion signal may indicate one or more motion parameters of the animal. Exemplary motion parameters may include an acceleration, a motion frequency, a motion amplitude, or the like, or any combination thereof. The motion signal generation module 730 may be electrically connected to the motion signal processing module 740 and transmit the motion signal to the motion signal processing module 740 for further processing.

The motion signal processing module 740 may be configured to process the motion signal received from the motion signal generation module 730. For example, the motion signal processing module 740 may determine whether a motion parameter of the animal exceeds a corresponding first threshold value or is within a first preset range. More descriptions regarding the motion signal processing module 740 may be found elsewhere in the present disclosure. See, e.g., FIG. 9 and the relevant description thereof.

The physiological signal generation module 750 may be configured to generate a physiological signal. The physiological signal may indicate one or more physiological parameters of the animal. Exemplary physiological parameters may include a body temperature, a blood oxygen, a heartbeat, a blood pressure, a respiratory rate, a pulse rate, or the like, or any combination thereof. The physiological signal generation module 750 may be electrically connected to the physiological signal processing module 760 and transmit the physiological signal to the physiological signal processing module 760 for further processing.

The physiological signal processing module 760 may be configured to process the physiological signal received from the physiological signal generation module 750. For example, the physiological signal processing module 760 may determine whether the physiological parameter exceeds a second threshold value or is within a second preset range. More descriptions regarding the physiological signal processing module 760 may be found elsewhere in the present disclosure. See, e.g., FIG. 10 and the relevant description thereof.

The microprocessor 770 may be electrically connected to the audio signal processing module 720, the motion signal processing module 740, and/or the physiological signal processing module 760. In some embodiments, the microprocessor 770 may be configured to receive one or more processing results from one or more of the audio signal processing module 720, the motion signal processing module 740, and the physiological signal processing module 760. Optionally, the microprocessor 770 may generate an instruction to cause the correction component 780 to perform an anti-bark operation on the animal based on the processing result(s).

The correction component 780 may be configured to perform one or more correction operations (e.g., an anti-bark operation) on the animal. Exemplary correction operations may include generating a vibration, an electrical shock, a spray, a sound (e.g., beep), a light, an ultrasound, or the like, or any combination thereof. The correction component 780 may have the same or similar function as the correction component 270 as described in connection with FIG. 2.

Figure 8:
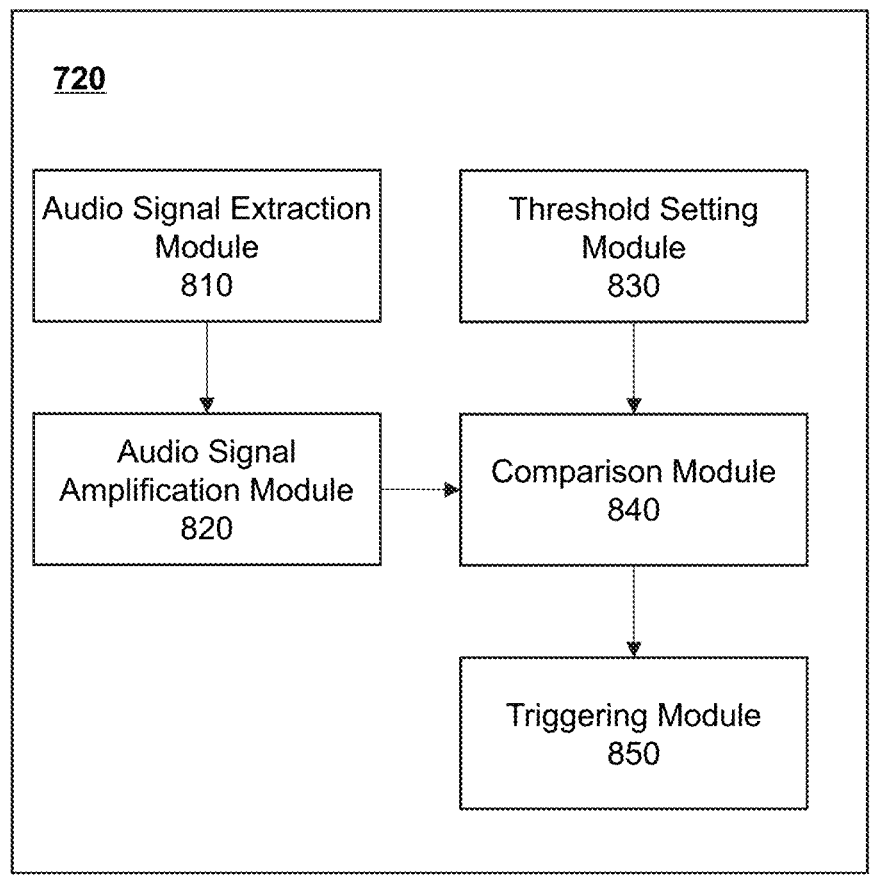
FIG. 8 is a block diagram illustrating an exemplary audio signal processing module according to some embodiments of the present disclosure.

FIG. 8 is a block diagram illustrating an exemplary audio signal processing module 720 according to some embodiments of the present disclosure.

As illustrated in FIG. 8, the audio signal processing module 720 may include an audio signal extraction module 810, an audio signal amplification module 820, a threshold setting module 830, a comparison module 840, and a triggering module 850.

The audio signal extraction module 810 may be configured to extract a target audio signal from, e.g., an audio signal received from the audio signal generation module 710. The audio signal may represent a sound including, for example, a sound generated by the animal (also referred to as a target sound), a sound generated by another animal, a sound generated by a human, an environmental noise, or the like, or any combination thereof. The audio signal extraction module 810 may extract the target audio signal representing the target sound from the audio signal. More descriptions regarding the extraction of the target audio signal may be found elsewhere in the present disclosure. See, e.g., operation 508 in FIG. 5 and the relevant description thereof.

The audio signal extraction module 810 may be electrically connected to the audio signal amplification module 820, and configured to transmit the extracted target audio signal the audio signal amplification module 820. The audio signal amplification module 820 may be configured to amplify the target audio signal. The audio signal amplification module 820 may be electrically connected to the comparison module 840, and configured to transmit the amplified target audio signal to the comparison module 840.

The threshold setting module 830 may be configured to set one or more third threshold values relating to one or more acoustic features (e.g., a frequency, an amplitude, a phase). The threshold setting module 830 may determine the third threshold value(s) based on a default setting of the animal control system 100, identity information of the animal, historical information of the animal, or the like, or any combination thereof. In some embodiments, the threshold setting module 830 may be electrically connected to the comparison module 840, and transmit the third threshold value(s) to the comparison module 840.

The comparison module 840 may be configured to compare an acoustic feature value of the amplified target audio signal with a corresponding third threshold value set by the threshold setting module 830. For example, the comparison module 840 may compare an amplitude of the amplified target audio signal with a corresponding threshold amplitude, and transmit the comparison result to the triggering module 850.

The triggering module 850 may be configured to determine whether a correction operation needs to be performed on the animal based on the comparison result received from the comparison module 840. For example, if the comparison module 840 determines that the acoustic feature value of the amplified target audio signal is greater than its corresponding third threshold value, the triggering module 850 may determine that a correction operation needs to be performed on the animal. Optionally, the triggering module 850 may transmit the determination result to the microprocessor 770.

Figure 9:
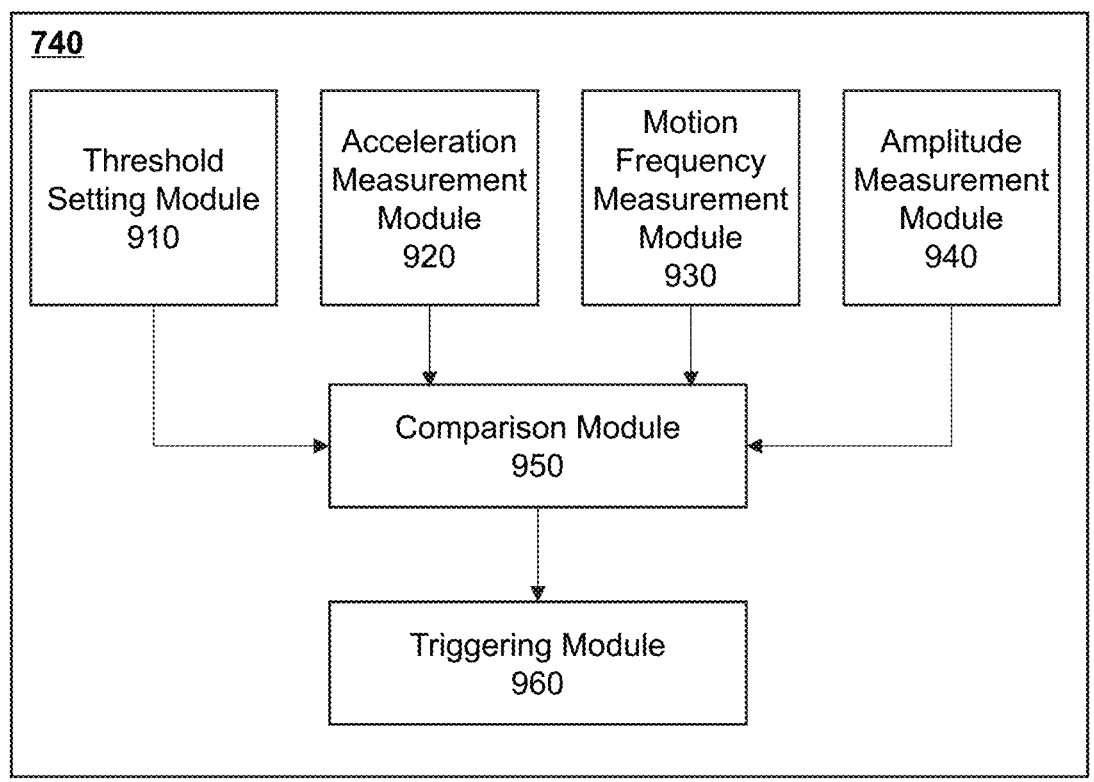
FIG. 9 is a block diagram illustrating an exemplary motion signal processing module according to some embodiments of the present disclosure.

FIG. 9 is a block diagram illustrating an exemplary motion signal processing module 740 according to some embodiments of the present disclosure.

As illustrated in FIG. 9, the motion signal processing module 740 may include a threshold setting module 910, an acceleration measurement module 920, a motion frequency measurement module 930, an amplitude measurement module 940, a comparison module 950, and a triggering module 960.

The threshold setting module 910 may be configured to set one or more first threshold values relating to one or more motion parameters (e.g., a motion direction, an acceleration, a motion velocity, a motion amplitude). The threshold setting module 910 may be electrically connected to the comparison module 950, and transmit the first threshold value(s) to the comparison module 950.

The acceleration measurement module 920 may be configured to measure an acceleration of a motion of the animal (e.g., a motion of the neck or mouth of the animal). The motion frequency measurement module 930 may be configured to measure a motion frequency of the motion of the animal. The amplitude measurement module 940 may be configured to measure a motion amplitude of the motion of the animal. Each of the acceleration measurement module 920, the motion frequency measurement module 930, and the amplitude measurement module 940 may be electrically connected to the comparison module 950, and transmit their respective measurement result to the comparison module 950.

The comparison module 950 may be configured to compare one or more measured motion parameters of the animal (e.g., the measured acceleration, the measured motion frequency, and/or the measured motion amplitude) with one or more first threshold values set by the threshold setting module 910. For example, the comparison module 950 may compare the measured acceleration with a corresponding threshold acceleration.

The triggering module 960 may be configured to receive the comparison result from the comparison module 950, and determine whether a correction operation needs to be performed on the animal based on the comparison result. The triggering module 960 may further transmit the determination result to the microprocessor 770.

Figure 10:
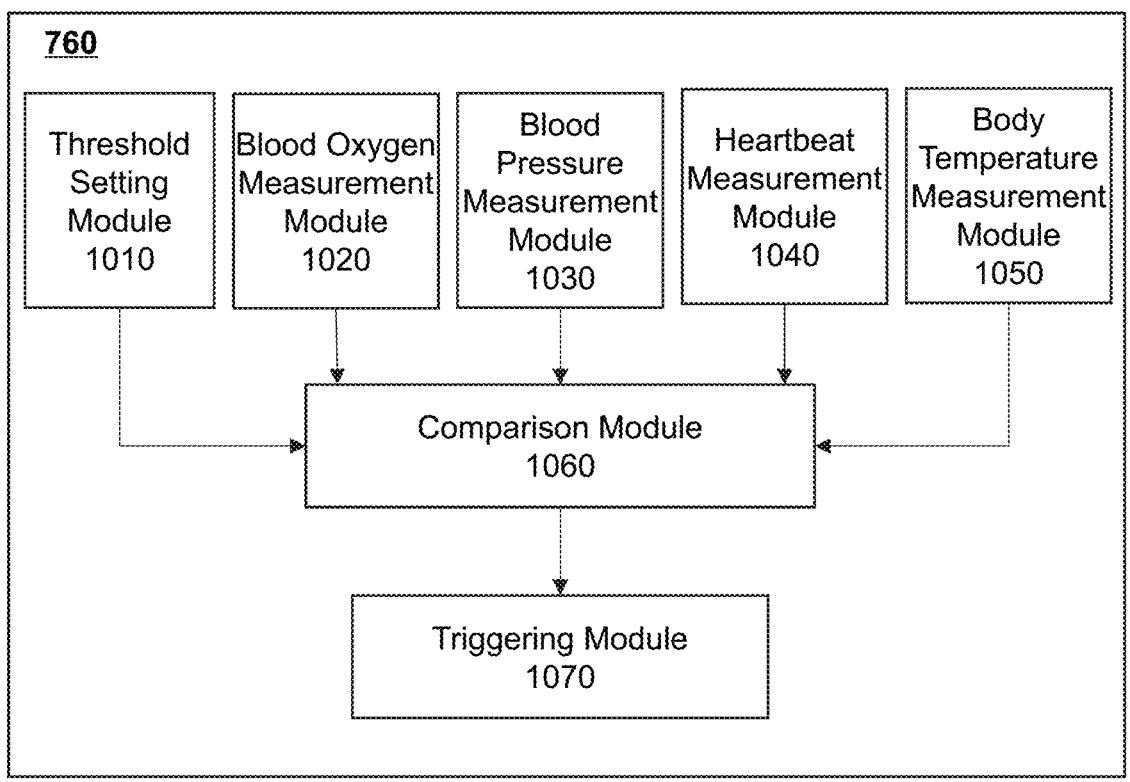
FIG. 10 is a block diagram illustrating an exemplary physiological signal processing module according to some embodiments of the present disclosure.

FIG. 10 is a block diagram illustrating an exemplary physiological signal processing module 760 according to some embodiments of the present disclosure.

As illustrated in FIG. 10, the physiological signal processing module 760 may include a threshold setting module 1010, a blood oxygen measurement module 1020, a blood pressure measurement module 1030, a heartbeat measurement module 1040, a body temperature measurement module 1050, a comparison module 1060, and a triggering module 1070.

The threshold setting module 1010 may be configured to set one or more second threshold values relating to one or more physiological parameters (e.g., a body temperature, a blood oxygen, a heartbeat, a blood pressure, a respiratory rate, a pulse rate). The threshold setting module 1010 may be electrically connected to the comparison module 1060, and transmit the second threshold value(s) to the comparison module 1060.

The blood oxygen measurement module 1020 may be configured to measure a blood oxygen of the animal. The blood pressure measurement module 1030 may be configured to measure a blood pressure of the animal. The heartbeat measurement module 1040 may be configured to measure a heartbeat of the animal. The body temperature measurement module 1050 may be configured to measure a body temperature of the animal. In some embodiments, the blood oxygen measurement module 1020, the blood pressure measurement module 1030, the heartbeat measurement module 1040, and the body temperature measurement module 1050 may perform measurements based on a same physiological signal or different physiological signals received from the physiological signal generation module 750 as described in connection with FIG. 7.

The comparison module 1060 may be configured to compare one or more measured physiological parameters (e.g., the measured blood oxygen, the measured blood pressure, the measured heartbeat, the measured body temperature) with their corresponding second threshold values set by the threshold setting module 1010. For example, the comparison module 1060 may compare the measured heartbeat with a corresponding threshold heartbeat.

The triggering module 1070 may be configured to receive the comparison result from the comparison module 1060, and determine whether a correction operation needs to be performed on the animal based on the comparison result. The triggering module 1070 may further transmit the determination result to the microprocessor 770. In some embodiments, the microprocessor 770 may receive a determination result from each of the triggering module 850, the triggering module 960, and the triggering module 1070. If one or more of the determination results (e.g., one, two, or all of the determination results) indicate that a correction operation needs to be performed on the animal, the microprocessor 770 may direct the correction component 780 to perform a correction operation.

Figure 11:
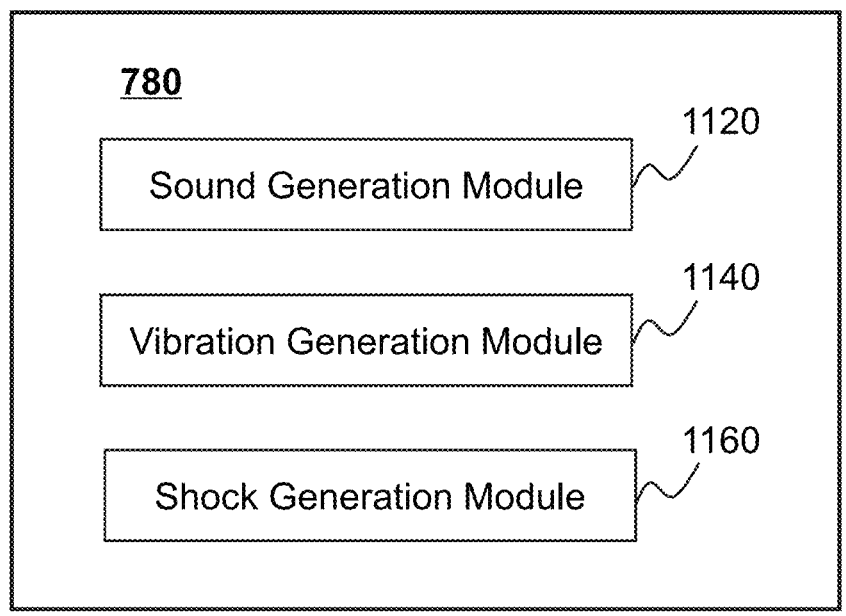
FIG. 11 is a block diagram illustrating an exemplary correction component according to some embodiments of the present disclosure.

FIG. 11 is a block diagram illustrating an exemplary correction component 780 according to some embodiments of the present disclosure.

As illustrated in FIG. 11, the correction component 780 may include a sound generation module 1120, a vibration generation module 1140, and a shock generation module 1160.

The sound generation module 1120 may be configured to generate and broadcast a sound for, for example, warning, training, praising, comforting the animal, stopping and/or preventing an unwelcome behavior of the animal, etc. The sound generated by the sound generation module 1120 may include a beep, a command (e.g., previously recorded by an owner of the animal), or the like, or any combination thereof. The vibration generation module 1140 may be configured to generate a vibration. The shock generation module 1160 may be configured to generate an electrical stimulus.

It should be noted that the example in FIGS. 7 to 11 and the description thereof is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. One or more additional components not shown may be added and/or one or more components shown in FIGS. 7 to 11 may be omitted. Additionally or alternatively, two or more components may be integrated into one component. A component may be divided into a plurality of units. In some embodiments, the connections between components as shown in FIGS. 7 to 11 are illustrative. Any two components of the monitoring device 700, the audio signal processing module 720, the motion signal processing module 740, and/or the physiological signal processing module 760 may be connected or not. The connection between two components thereof may be a one-way connection or two-way connection. The connection may include a wired connection and/or a wireless connection.

It will be apparent to those skilled in the art that various changes and modifications can be made in the present disclosure without departing from the spirit and scope of the disclosure. In this manner, the present disclosure may be intended to include such modifications and variations if the modifications and variations of the present disclosure are within the scope of the appended claims and the equivalents thereof.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "module," "unit," "component," "device," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB. NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claim subject matter lie in less than all features of a single foregoing disclosed embodiment.

In some embodiments, the numbers expressing quantities or properties used to describe and claim certain embodiments of the application are to be understood as being modified in some instances by the term "about," "approximate," or "substantially." For example, "about," "approximate," or "substantially" may indicate a certain variation (e.g., ±1%, ±5%, ±10%, or ±20%) of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable. In some embodiments, a classification condition used in classification is provided for illustration purposes and modified according to different situations. For example, a classification condition that "a probability value is greater than the threshold value" may further include or exclude a condition that "the probability value is equal to the threshold value."

What is claimed is:

1. A system for controlling barking of an animal that wears a monitoring device, the system comprising:
    at least one storage device including a set of instructions; and
    at least one processor configured to communicate with the at least one storage device, wherein when executing the set of instructions, the at least one processor is configured to direct the system to perform operations including:
    obtaining, from the monitoring device, status information of the animal, the status information including a second audio signal representing a second sound;
    determining, based on one or more first voiceprint features of the animal and one or more second voiceprint features of the second sound, whether the animal is barking, wherein the one or more first voiceprint features being used to uniquely identify the animal;
    in response to a determination that the animal is barking, obtaining, from the monitoring device, a first audio signal representing a first sound;
    extracting, based on at least one of a sound frequency or a pitch of the first audio signal, a portion of the first audio signal as a target audio signal that represents a target sound made by the animal;
    determining, based on the target audio signal, whether an anti-bark operation needs to be performed on the animal; and
    in response to a determination that the anti-bark operation needs to be performed on the animal, causing the monitoring device to perform the anti-bark operation on the animal.

2. The system of claim 1, wherein the monitoring device includes an audio sensor, the second audio signal representing the second sound acquired by the audio sensor, and the determining, based on one or more first voiceprint features of the animal and one or more second voiceprint features of the second sound, whether the animal is barking includes:
    determining, based on the one or more first voiceprint features and the one or more second voiceprint features, whether the second sound is made by the animal; and
    in response a determination that the second sound is made by the animal, determining that the animal is barking.

3. The system of claim 2, the one or more first voiceprint features include at least one of a tone, a pitch, a length, a sound intensity, a sound frequency, a rhythm, a linear prediction coefficients feature, a perceptual linear predictive feature, a Tandem feature, a linear predictive cepstral coefficient feature, a Mel frequency cepstrum coefficient feature, a deep feature, or a power-normalized cepstral coefficient feature.

4. The system of claim 1, wherein the monitoring device includes a motion sensor, the status information of the animal includes a motion signal indicating a motion parameter of a mouth or a neck of the animal, and the operations further includes:
    determining, based on the motion signal, whether the motion parameter of the mouth or the neck of the animal exceeds a first threshold value; and
    in response to a determination that the motion of the mouth or the neck of the animal exceeds a first threshold value, determining that the animal is barking.

5. The system of claim 1, wherein the monitoring device includes a physiological sensor, the status information of the animal includes a physiological signal indicating a physiological parameter of the animal, and the operations further includes:
    determining, based on the physiological parameter, whether the physiological parameter of the animal exceeds a second threshold value; and in response to a determination that the physiological parameter of the animal exceeds the second threshold value, determining that the animal is barking.

6. The system of claim 1, wherein the determining, based on the target audio signal, whether an anti-bark operation needs to be performed on the animal includes:
   determining, based on the target audio signal, an acoustic feature value of the first sound;
   determining whether the acoustic feature value is greater than a third threshold value; and
   in response to a determination that the acoustic feature value is greater than the third threshold value, determining that the anti-bark operation needs to be performed on the animal.

7. The system of claim 6, the operations further comprising:
   determining the third threshold value based on at least one of a characteristic of the animal or an environment of the animal.

8. The system of claim 1, wherein the performing the anti-bark operation includes:
   causing the monitoring device to generate at least one of a sound, a vibration, an electric shock, a light, an ultrasound, or spray.

9. A method for controlling barking of an animal that wears a monitoring device, the method comprising:
   obtaining, from the monitoring device, status information of the animal, the status information including a second audio signal representing a second sound;
   determining, based on one or more first voiceprint features of the animal and one or more second voiceprint features of the second sound, whether the animal is barking, wherein the one or more first voiceprint features being used to uniquely identify the animal;
   in response to a determination that the animal is barking, obtaining, from the monitoring device, a first audio signal representing a first sound;
   extracting, based on at least one of a sound frequency or a pitch of the first audio signal, a portion of the first audio signal as a target audio signal that represents a target sound made by the animal;
   determining, based on the target audio signal, whether an anti-bark operation needs to be performed on the animal; and
   in response to a determination that the anti-bark operation needs to be performed on the animal, causing the monitoring device to perform the anti-bark operation on the animal.

10. The method of claim 9, wherein the monitoring device includes an audio sensor, the second audio signal representing the second sound acquired by the audio sensor, and the determining, based on one or more first voiceprint features of the animal and one or more second voiceprint features of the second sound, whether the animal is barking includes:
    determining, based on the one or more first voiceprint features and the one or more second voiceprint features, whether the second sound is made by the animal; and
    in response a determination that the second sound is made by the animal, determining that the animal is barking.

11. The method of claim 10, the one or more first voiceprint features include at least one of a tone, a pitch, a length, a sound intensity, a sound frequency, a rhythm, a linear prediction coefficients feature, a perceptual linear predictive feature, a Tandem feature, a linear predictive cepstral coefficient feature, a Mel frequency cepstrum coefficient feature, a deep feature, or a power-normalized cepstral coefficient feature.

12. The method of claim 9, wherein the monitoring device includes a motion sensor, the status information of the animal includes a motion signal indicating a motion parameter of a mouth or a neck of the animal, and the method further includes:
    determining, based on the motion signal, whether the motion parameter of the mouth or the neck of the animal exceeds a first threshold value; and
    in response to a determination that the motion of the mouth or the neck of the animal exceeds a first threshold value, determining that the animal is barking.

13. The method of claim 9, wherein the monitoring device includes a physiological sensor, the status information of the animal includes a physiological signal indicating a physiological parameter of the animal, and the method further includes:
    determining, based on the physiological parameter, whether the physiological parameter of the animal exceeds a second threshold value; and
    in response to a determination that the physiological parameter of the animal exceeds the second threshold value, determining that the animal is barking.

14. The method of claim 9, wherein the determining, based on the target audio signal, whether an anti-bark operation needs to be performed on the animal includes:
    determining, based on the target audio signal, an acoustic feature value of the first sound;
    determining whether the acoustic feature value is greater than a third threshold value; and
    in response to a determination that the acoustic feature value is greater than the third threshold value, determining that the anti-bark operation needs to be performed on the animal.

15. The method of claim 14, further comprising:
    determining the third threshold value based on at least one of a characteristic of the animal or an environment of the animal.

16. The method of claim 14, wherein the performing the anti-bark operation includes:
    causing the monitoring device to generate at least one of a sound, a vibration, an electric shock, a light, an ultrasound, or spray.

17. A non-transitory computer readable medium, comprising a set of instructions for controlling barking of an animal that wears a monitoring device, wherein when executed by at least one processor, the set of instructions direct the at least one processor to effectuate a method, the method comprising:
    obtaining, from the monitoring device, status information of the animal, the status information including a second audio signal representing a second sound;
    determining, based on one or more first voiceprint features of the animal and one or more second voiceprint features of the second sound, whether the animal is barking, wherein the one or more first voiceprint features being used to uniquely identify the animal;
    in response to a determination that the animal is barking, obtaining, from the monitoring device, a first audio signal representing a first sound;
    extracting, based on at least one of a sound frequency or a pitch of the first audio signal, a portion of the first audio signal as a target audio signal that represents a target sound made by the animal;
    determining, based on the target audio signal, whether an anti-bark operation needs to be performed on the animal; and in response to a determination that the anti-bark operation needs to be performed on the animal, causing the monitoring device to perform the anti-bark operation on the animal.

18. The non-transitory computer readable medium of claim 17, wherein the monitoring device includes an audio sensor, the second audio signal representing the second sound being acquired by the audio sensor, and the determining, based on one or more first voiceprint features of the animal and one or more second voiceprint features of the second sound, whether the animal is barking includes:

determining, based on the one or more first voiceprint features and the one or more second voiceprint features, whether the second sound is made by the animal; and in response a determination that the second sound is made by the animal, determining that the animal is barking.

* * * * *